United States Patent
Pintér et al.

(10) Patent No.: US 11,526,587 B2
(45) Date of Patent: Dec. 13, 2022

(54) PRIVILEGED ACCESS MANAGEMENT FOR APPLICATIONS

(71) Applicant: One Identity LLC, Aliso Viejo, CA (US)

(72) Inventors: András Pintér, Veszprém (HU); László Zana, Balatonfüred (HU)

(73) Assignee: One Identity LLC, Aliso Viejo, CA (US)

(*) Notice: Subject to any disclaimer, the term of this patent is extended or adjusted under 35 U.S.C. 154(b) by 407 days.

(21) Appl. No.: 16/568,656

(22) Filed: Sep. 12, 2019

(65) Prior Publication Data

US 2020/0272712 A1 Aug. 27, 2020

Related U.S. Application Data

(60) Provisional application No. 62/810,847, filed on Feb. 26, 2019.

(51) Int. Cl.
*G06F 17/00* (2019.01)
*G06F 21/31* (2013.01)
*H04L 9/40* (2022.01)
*G06F 9/451* (2018.01)
*G06F 16/958* (2019.01)
*G06F 16/954* (2019.01)

(52) U.S. Cl.
CPC ............ *G06F 21/31* (2013.01); *G06F 9/451* (2018.02); *G06F 16/954* (2019.01); *G06F 16/986* (2019.01); *H04L 63/0281* (2013.01); *H04L 63/102* (2013.01)

(58) Field of Classification Search
CPC ........ G06F 21/31; G06F 9/451; G06F 16/986; G06F 16/954; H04L 63/0281
See application file for complete search history.

(56) References Cited

U.S. PATENT DOCUMENTS

| | | | |
|---|---|---|---|
| 9,015,711 B2* | 4/2015 | Tsirkin | G06F 1/3265 718/1 |
| 9,201,680 B2* | 12/2015 | Tsirkin | G06F 9/451 |
| 9,513,955 B2* | 12/2016 | Zhong | H04L 69/28 |
| 10,061,603 B2* | 8/2018 | Gupta | G06F 9/45558 |
| 10,205,821 B2* | 2/2019 | Morita | H04M 1/72484 |
| 10,255,093 B2* | 4/2019 | Yan | G06F 9/466 |
| 10,963,279 B2* | 3/2021 | Lection | G06F 9/45558 |
| 2012/0311578 A1* | 12/2012 | Hara | G06F 9/45558 718/1 |
| 2013/0268580 A1* | 10/2013 | Vilke | G06F 9/45533 709/203 |
| 2015/0187041 A1* | 7/2015 | Fear | G06F 9/452 345/520 |
| 2017/0220368 A1* | 8/2017 | Tse | G06F 9/45558 |
| 2018/0032303 A1* | 2/2018 | Lee | G06T 1/20 |
| 2018/0039504 A1* | 2/2018 | Akuzawa | G06F 9/45529 |
| 2019/0146645 A1* | 5/2019 | DeGangi | G06F 3/0484 715/704 |
| 2020/0409674 A1* | 12/2020 | Chung | G06F 21/6218 |
| 2021/0250333 A1* | 8/2021 | Negrea | G06F 9/547 |

* cited by examiner

*Primary Examiner* — Mohammed H Zuberi
(74) *Attorney, Agent, or Firm* — Kirton McConkie; Brian Tucker

(57) ABSTRACT

A user of a client can access an application using privileged credentials without having direct access to or knowledge of the privileged credentials. The user's access to the application can also be monitored using a custom protocol including recording the user's interactions with the application while logged in with the privileged credentials.

20 Claims, 24 Drawing Sheets

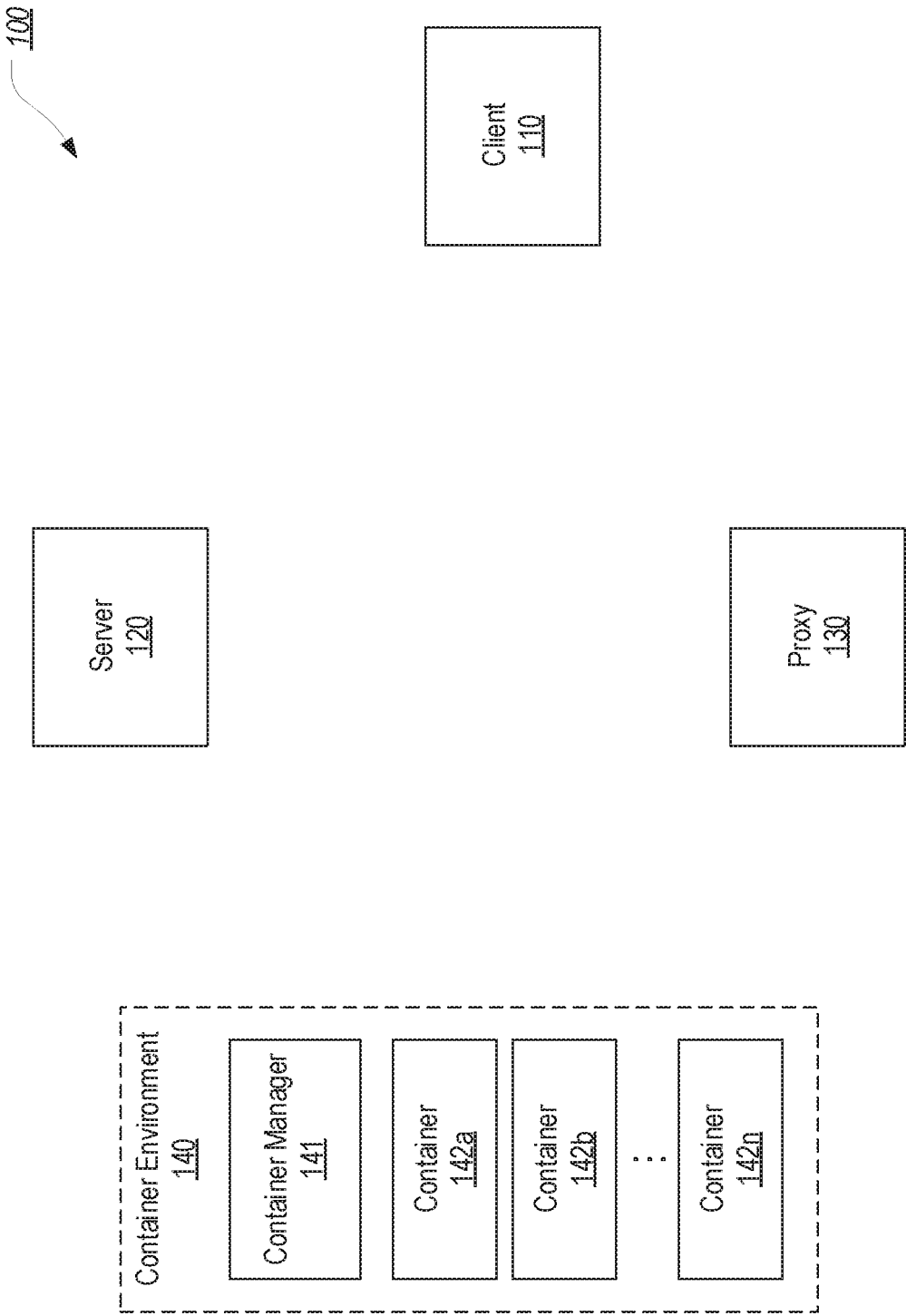

PRIVILEGED ACCESS MANAGEMENT FOR APPLICATIONS

CROSS-REFERENCE TO RELATED APPLICATIONS

This application claims the benefit of U.S. Provisional Patent Application No. 62/810,847, which was filed on Feb. 26, 2019.

BACKGROUND

It is oftentimes necessary for multiple individuals (e.g., employees) to represent an organization (e.g., a company) when performing online tasks. For example, multiple employees in a company's marketing department may have access to the company's social media credentials to allow those employees to post content on the company's account. Similarly, multiple employees in a company's finance department may have access to the company's banking credentials to allow those employees to access the company's banking records or execute transactions. Multiple employees may also have access to admin credentials for accessing admin-level functionality of various types of systems or services.

Various problems arise when multiple individuals have access to an organization's credentials for online accounts. Because each of the multiple individuals has access to the same credentials, it is difficult to attribute any actions performed on an online account to any particular individual. For example, if a distasteful post is made on a company's social media account, it may be difficult to identify which employee submitted the post. Additionally, by having access to the organization's credentials, each individual will have unrestricted, unsupervised and unaudited access to the online accounts. For example, any employee that knows the company's banking credentials would be able to access all of the company's records or to perform any transactions that are available via the online banking account.

Further, when multiple individuals know or have access to an organization's credentials, the risk of the credentials becoming compromised is greatly increased. The difficulty of managing the credentials is also increased. For example, if the password for the company's social media account is changed, all employees that have access to the social media credentials must be notified. Similarly, if an employee who knows the privileged credentials leaves the company, the privileged credentials will need to be updated and all other employees that use the privileged credentials will need to be notified.

BRIEF SUMMARY

The present invention extends to methods, systems, and computer program products for implementing privileged access management for applications. A user of a client can access an application using privileged credentials without having access to or knowledge of the privileged credentials. The user's access to the application can also be monitored using a custom protocol including recording the user's interactions with the application while logged in with the privileged credentials.

In some embodiments, the present invention is implemented as a method for implementing privileged access management. A request to access an application can be received from a client. In response to the request, the application can be executed on a container including logging in to the application using privileged credentials. Protocol frames that define images of the user interface can then be created from a user interface of the application. The container can send the protocol communications containing the protocol frames to the client to cause the images of the user interface to be displayed on the client. The container can also receive additional protocol communications that define user input to the images that were displayed on the client. The container can then cause corresponding user input to be generated on the container and provided to the application.

In other embodiments, the present invention is implemented as computer storage media storing computer executable instructions which when executed implement a method for enabling a user to access an application using privileged credentials without having access to the privileged credentials. This method includes: receiving, from a user of a client, a request to access an application using privileged credentials that the user does not have access to; creating a container that includes the application; executing the application on the container including logging in to the application using the privileged credentials; creating, on the container, a first protocol frame that defines an image of a user interface of the application; sending the protocol frame to the client; and processing, on the client, the protocol frame to display the image of the user interface of the application.

In other embodiments, the present invention is implemented as a method for enabling a user to access an application using privileged credentials without having access to or knowledge of the privileged credentials. The method includes: receiving, from a user of a client, a request to access an application using privileged credentials that the user does not have access to; creating a container that includes the application; executing the application on the container including logging in to the application using the privileged credentials; while the application is executing on the container, creating and sending protocol frames to the client which define images of the application's user interface; employing the protocol frames to display the images of the application's user interface on the client; routing the protocol frames to a server for storage in a session log; receiving a request to replay the user's access to the application; employing the protocol frames stored in the session log to sequentially display the images of the application's user interface to thereby replay the user's access to the application.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 1 illustrates an example computing environment in which the present invention may be implemented;

DETAILED DESCRIPTION

Figure 1A:
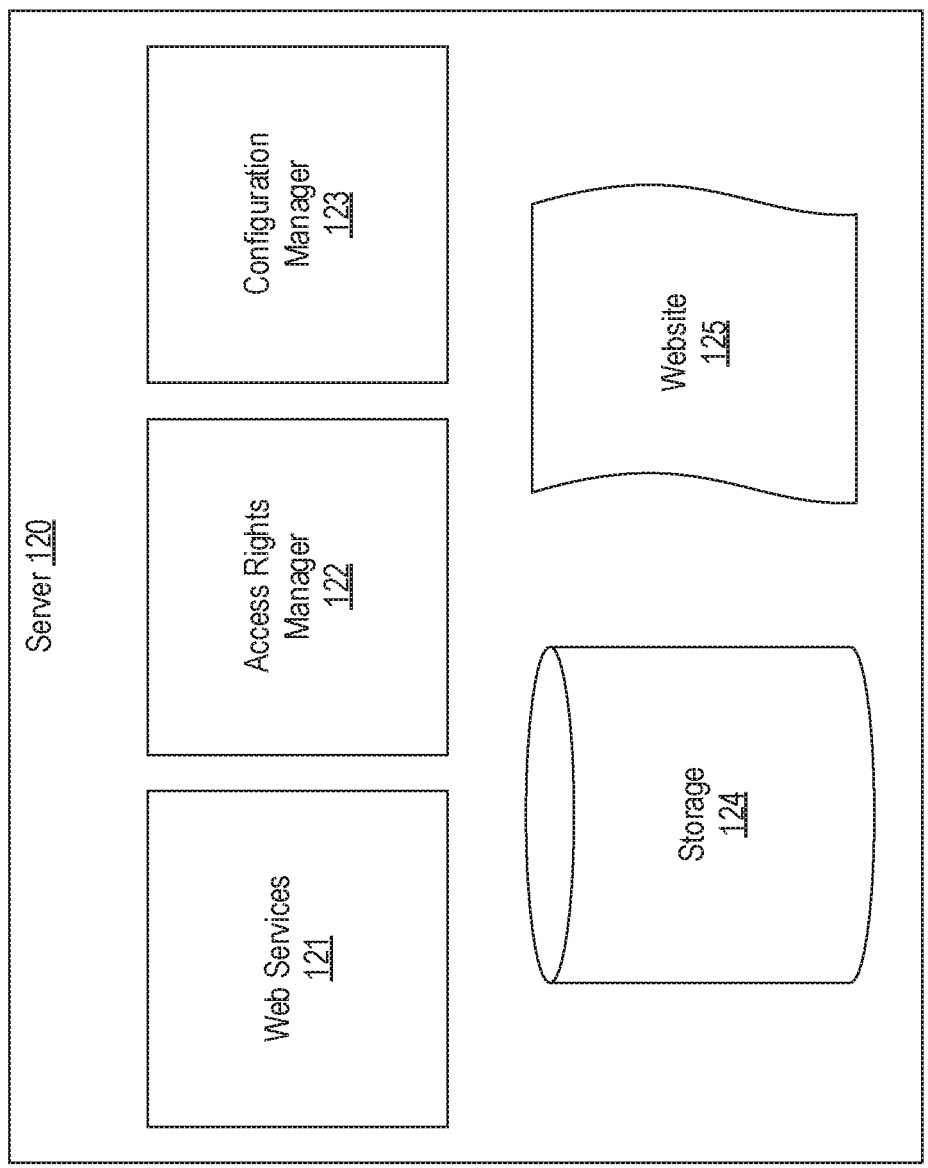
FIG. 1A illustrates an example of components that can be employed on a server within the example computing environment.

In this specification and the claims, the term "privileged credentials" should be construed as credentials for accessing an organization's account in an application. An organization should be construed broadly as encompassing any entity or group of individuals. Examples of privileged credentials include the username and password that a company uses to access its social media account or bank account. Privileged credentials should encompass any type of credentials (e.g., username, password, PIN, secret phrase, one-time code, etc.) that an application may require for logging in. In typical scenarios, privileged credentials can be construed as credentials that may be shared by multiple individuals to allow the multiple individuals to access the same account.

FIG. 1 illustrates an example computing environment 100 in which the present invention can be implemented. As depicted, computing environment 100 includes a client 110, a server 120, a proxy 130 and a container environment 140. Client 110 represents any computing device that a user could employ to access an application in accordance with the techniques of the present invention. For example, client 110 can represent a desktop computer, a laptop computer, a tablet, a smart television, a mobile phone, etc. Although a single client 110 is shown, any number of clients could be used in embodiments of the present invention.

Server 120 represents one or more computing devices, whether physical or virtual, that are configured to function as a server (e.g., a stand-alone server or a cloud). Server 120 can be configured to receive requests from client 110 over the internet, a LAN or any other network architecture using any suitable protocol (e.g., HTTPS). Like server 120, proxy 130 represents one or more computing devices, whether physical or virtual, that are configured to function as a proxy between client 110 and a container in container environment 140.

Container environment 140 represents a collection of resources that can be utilized to host/implement any number of containers 142a-142n (generally referred to as container (s) 142). Container environment 140 may oftentimes represent a cloud platform (e.g., Azure or AWS) but may equally represent one or more on-premises server computing devices. Container environment 140 may include a container manager 141 that starts, manages and/or stops the containers. The term "container" should be construed broadly as any virtualized environment in which software can run. The term container should therefore encompass, but should not be limited to, virtual machines, Linux containers, Docker containers, Windows Server containers, etc.

Server 120 can be configured to communicate with container manager 141 to instruct container manager 141 to create, start, manage, stop, etc. a container as will be described below. A container that may be started in container environment 140 can be configured to communicate with client 110 either directly or via proxy 130 as will also be described below.

FIG. 1A illustrates an example of components that may exist on server 120 to facilitate implementation of embodiments of the present invention. These components are intended to generally represent functionality that server 120 may be configured to perform and are not intended to represent any actual division in the code that executes on server 120. As shown, server 120 can include web services 121, access rights manager 122, configuration manager 123, storage 124 and website 125 among possibly many other components. Web services 121 are intended to represent the components that enable server 120 to receive and send communications with other computing devices in environment 100 such as client 110, proxy 130 and container environment 140. For example, web services 121 can encompass an application that listens for and processes requests from client 110, proxy 130 and container environment 140. Access rights manager 122 is intended to represent the components that verify access rights when a user of client 110 attempts to access functionality that server 120 provides. For example, access rights manager 122 can be configured to verify credentials (whether directly or via a third party service) that the user of client 110 submits. Configuration manager 123 is intended to represent the components that obtain and create information necessary for instructing container manager 141 to create and start a container in response to a request from client 110 as well as to instruct the modification of any existing container. Storage 124 represents the components that enable server 120 to store content whether locally or remotely. Website 125 can represent the combination of HTML, JavaScript, WebAssembly and/or other web content that server 120 sends to client 110 to enable a user to access an application in accordance with the techniques of the present invention.

Figure 1B:
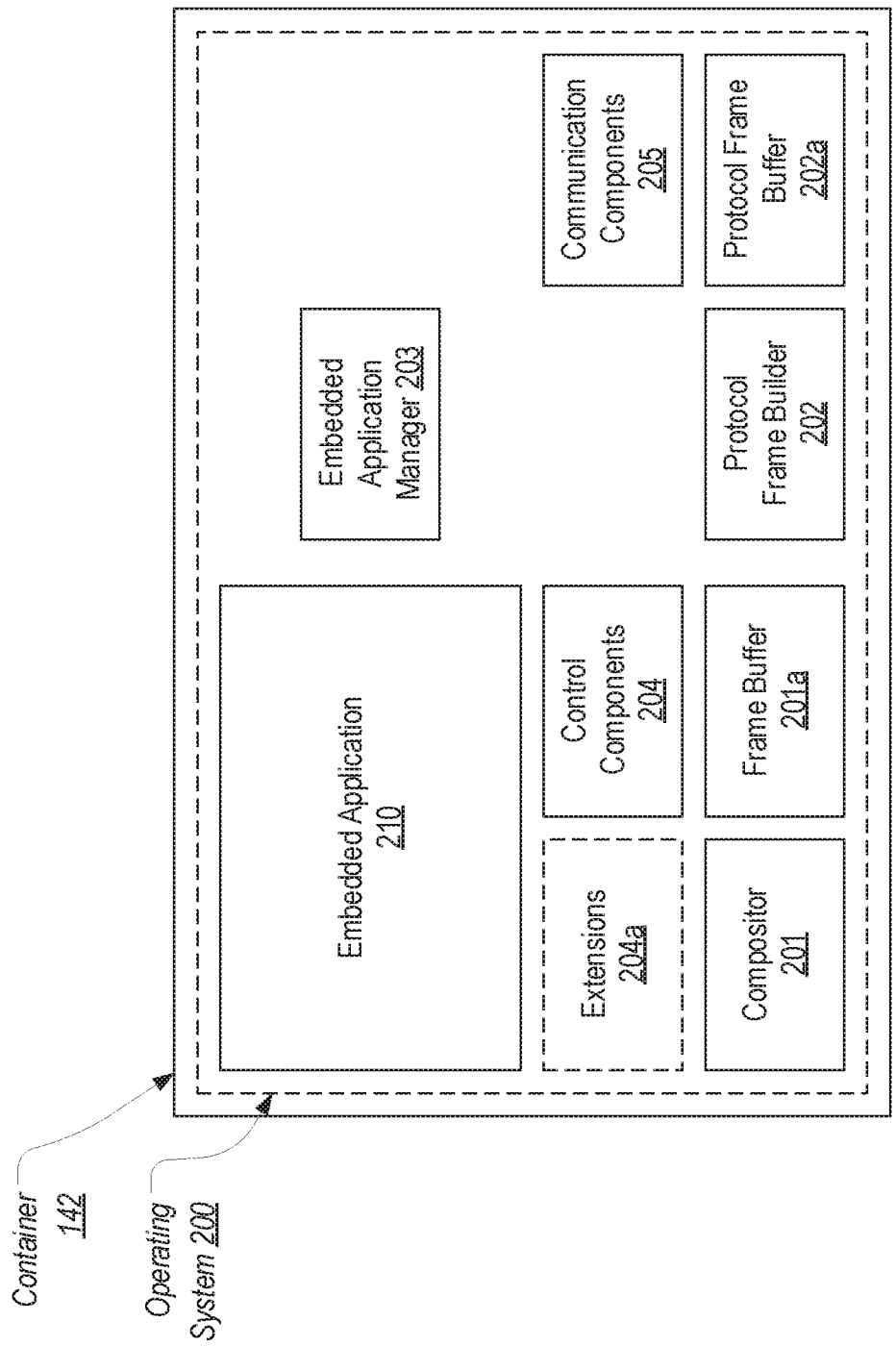
FIG. 1B illustrates an example of the components that can be employed on a container.

FIG. 1B illustrates that container 142 can include an operating system 200 having a number of components. Although these components are drawn as separate, they should not be construed as representing any particular division in the operating system's code. The depicted separation is intended only to facilitate the description of the functionality that the various components perform. As shown, operating system 200 hosts/includes an embedded application 210 that a user will access using privileged credentials. In typical embodiments, embedded application 210 may be a browser that is navigated to a particular website (e.g., facebook.com or chase.com). However, embedded application 210 can be any other application (e.g., the Facebook app that can be installed as a desktop application) and need not be a web-based or web-enabled application. In short, embedded application 210 represents any application that provides a user interface.

The present invention enables a user to access embedded application 210 using privileged credentials without having access to the privileged credentials and while enabling the user's interactions to be monitored, logged, audited, etc. Operating system 200 can include a number of components to enable this. As shown, operating system 200 can include a compositor 201 which represents the component(s) of operating system 200 that provide a "window" for embedded application 210 to output its user interface for display (although this user interface will not (or need not) be displayed at container 142). As one example only, compositor 201 could be an X11 compositor. As is understood by those of skill in the art, embedded application 210 can interface with compositor 201 to cause frames to be periodically generated and stored in frame buffer 201a. Such frames, which would consist of pixel data, define the appearance of embedded application 210's user interface. Accordingly, as embedded application 210 executes, compositor 201 (whether directly or indirectly) will cause frames representing the current appearance of embedded application 210's user interface to be stored in frame buffer 201a.

As indicated above, embedded application 210's user interface will not (or need not) be displayed at container 142. Instead, the user interface will be displayed on client 110. The present invention employs a custom protocol to accomplish this. To implement the custom protocol, operating system 200 includes a protocol frame builder 202 that accesses frames in frame buffer 201a (which may be implemented in shared memory) and converts them into "protocol frames" which can be stored in protocol frame buffer 202a (which may also be implemented in shared memory). A detailed explanation of this process is provided below with reference to FIGS. 7A-7E. Protocol frame builder 202 can also interface with communication components 204 to send protocol communications containing the protocol frames to client 110. Communication components 204 may typically represent a networking (e.g., TCP/IP) stack.

Operating system 200 also includes an embedded application manager 203 which may perform a number of tasks, typically in accordance with a configuration received from server 120, to manage the execution of embedded application 210. These tasks may include navigating embedded application 210 to a particular website (e.g., when embedded application 210 is a browser), injecting privileged credentials to log in and modifying the user interface among possibly many other tasks.

Operating system 200 also includes control components 204 which can represent the components that handle mouse input, keyboard input and other basic operating system tasks. Of particular relevance to the present invention, and as described in detail below, control components 204 can provide user input to embedded application 210 based on protocol communications received from client 110. Operating system 200 may also be configured to enable the use of optional extensions 204a for providing functionality beyond that provided by control components 204. For example, extensions 204a could be employed to enable embedded application 210 to access a local or remote file system, webcam or geolocation information, to enable various types of redirection, etc.

Figure 2A:
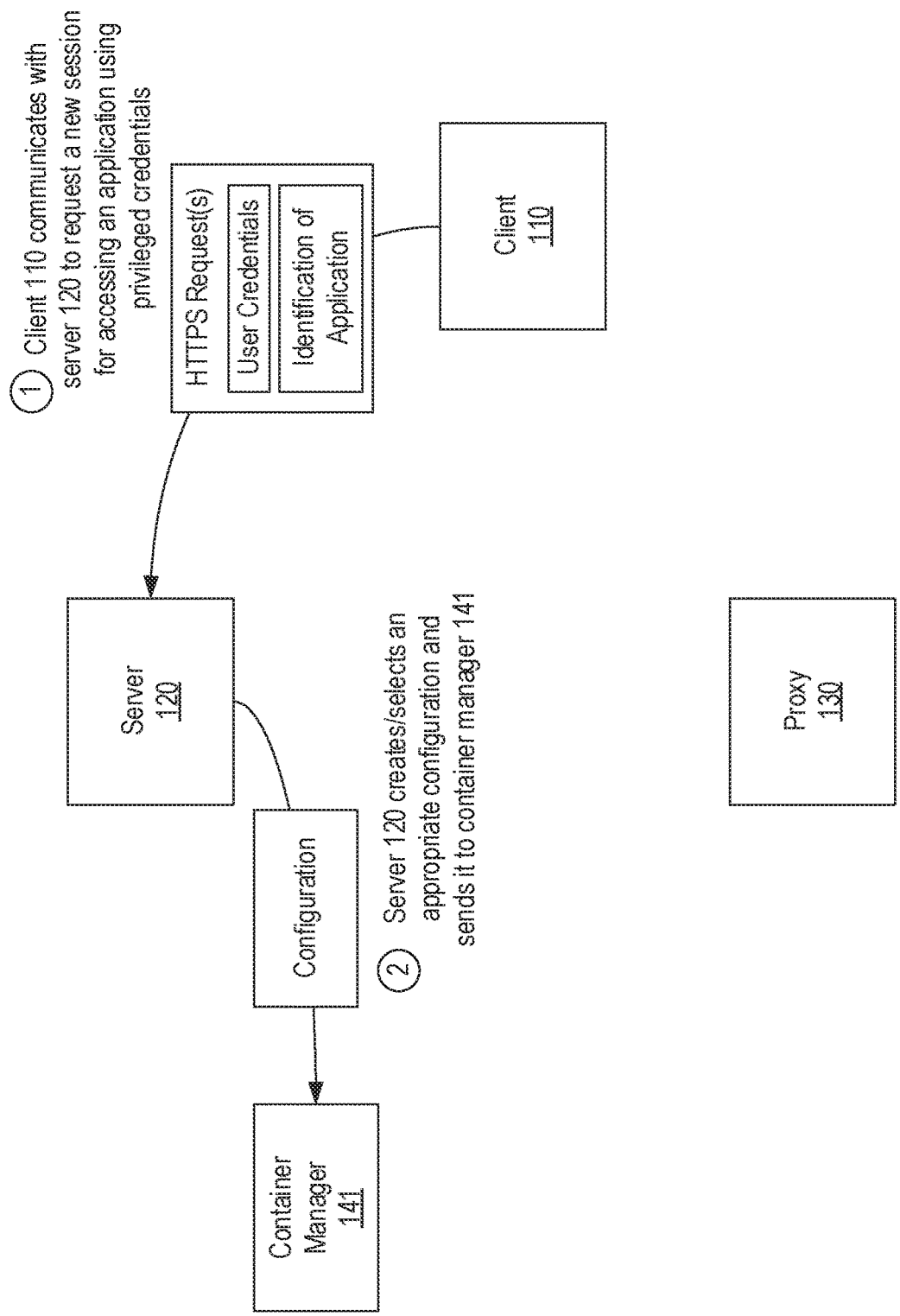
FIGS. 2A-2E provide an overview of how the present invention enables a user to access an application with privileged credentials while also monitoring this access.

FIGS. 2A-2E provide an overview of how the present invention enables a user to access an application using privileged credentials without having access to the privileged credentials as well as how the present invention enables the user's access (or "session") to be monitored. In FIG. 2A, it is assumed that a user of client 110 desires to access an application using privileged credentials. To accomplish this, and as represented in step 1, the user can employ client 110 to submit a request to server 120. As shown, this request could be in the form of one or more HTTPS requests that include the user's credentials (as opposed to the privileged credentials that the user desires to employ) and that identify the application that the user would like to access. For example, the user could employ a browser on client 110 to access and log in to website 125. Alternatively, a dedicated application, as opposed to a browser, could be installed on client 110 and could be configured to interface directly with web services 121 to implement the techniques of the present invention. Accordingly, the present invention should not be limited to any particular type of application that is employed on client 110.

Figure 6A:
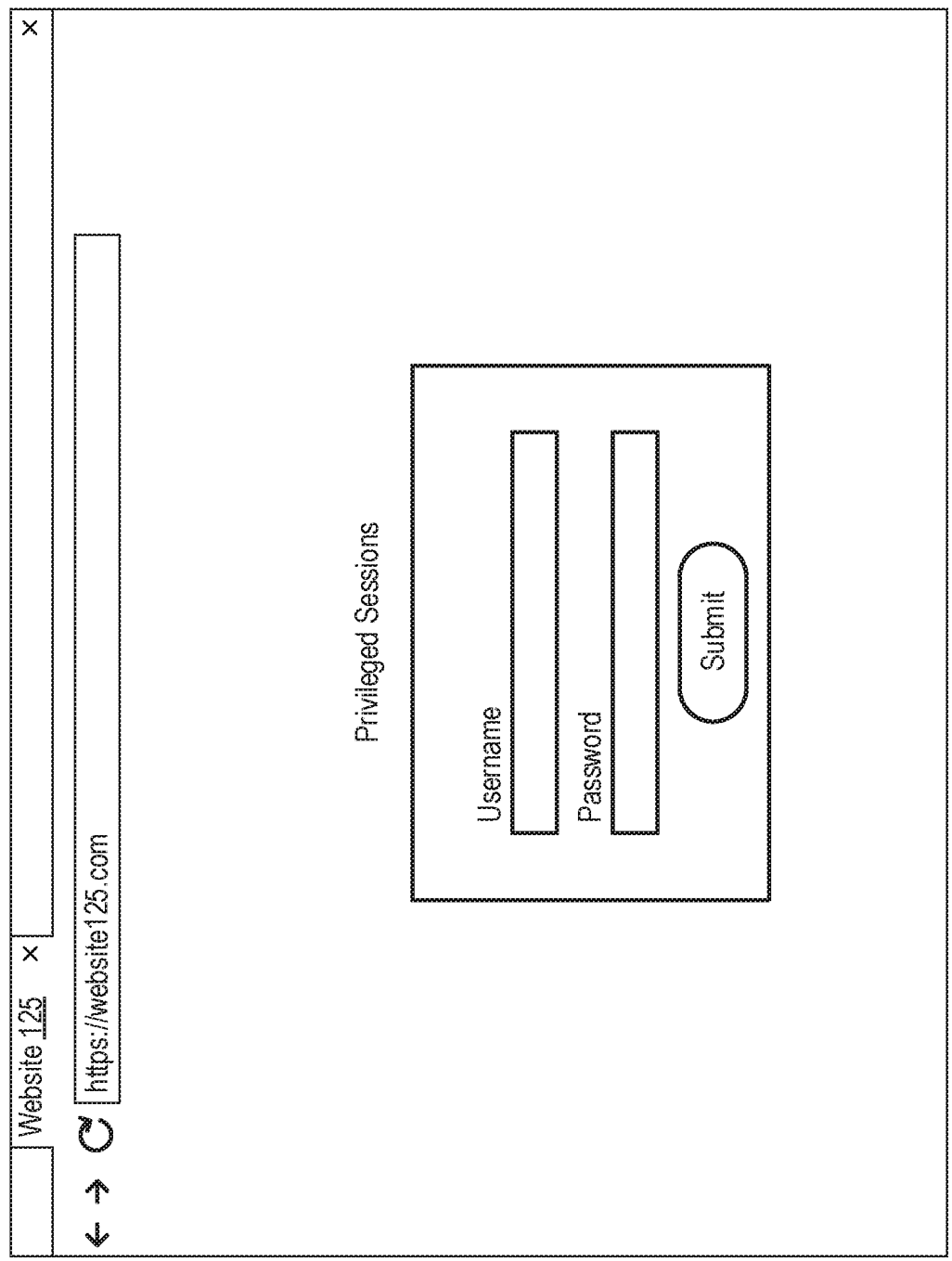
FIGS. 6A-6C provide examples of webpages that can be presented to a user of a client to enable the user to access an embedded application executing on a container.
Figure 6B:
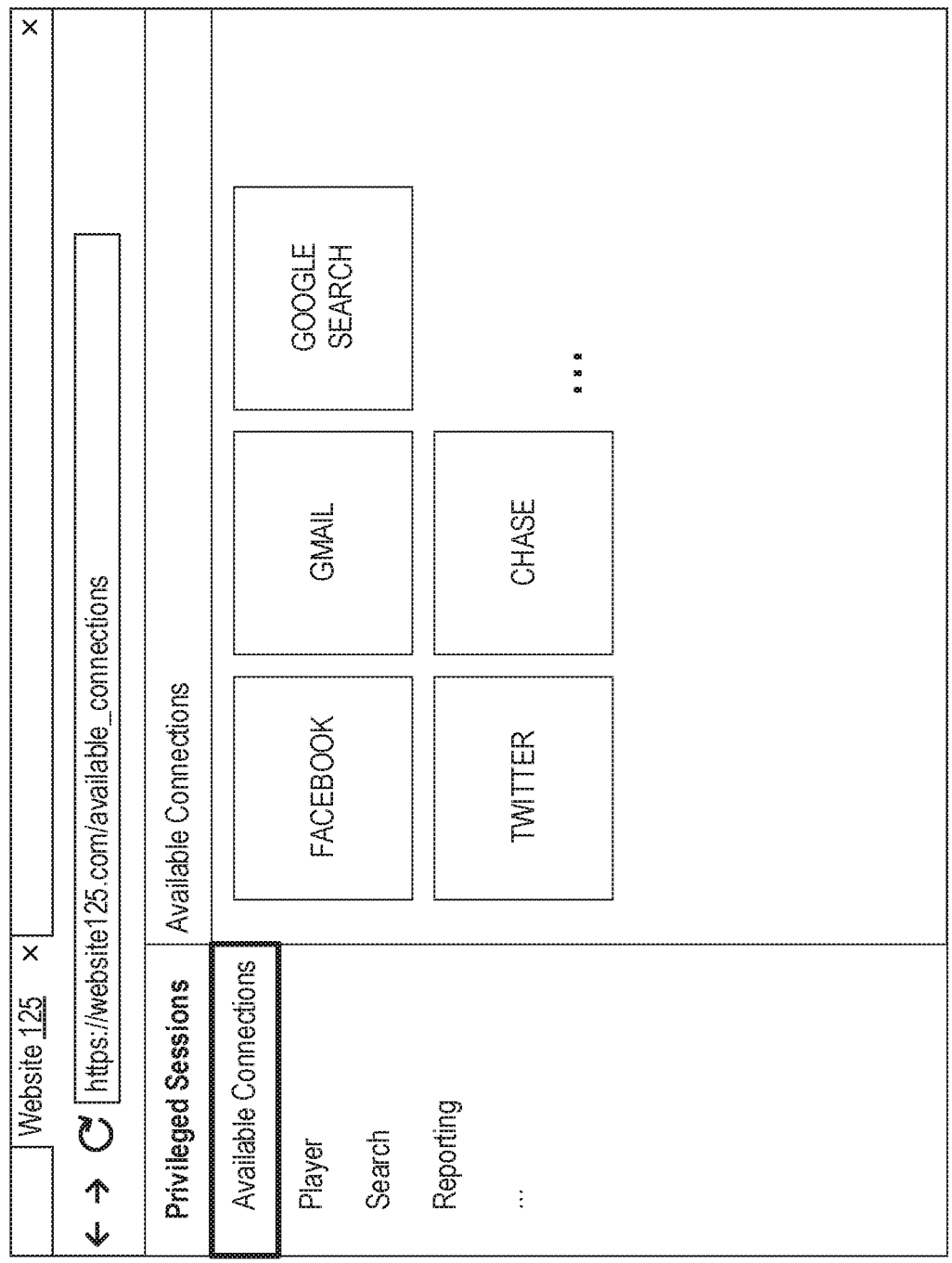

FIGS. 6A and 6B provide examples of how website 125 may enable the user to log in and select an application to access using privileged credentials. In FIG. 6A, it is assumed that the user has navigated a browser on client 110 to website 125 and has been presented with a webpage for logging in. In FIG. 6B, it is assumed that the user has logged in and, based on the identity of the user, server 120 has presented a webpage showing the applications that this user can access using privileged credentials (the "available connections"). The user may select any of these available connections to commence a "privileged session."

Returning to FIG. 2A, in response to the user's request to access a particular application using privileged credentials, in step 2, server 120 can create or select an appropriate configuration that can be used to create a container for executing the application and sends the configuration to container manager 141. As will be described in more detail below, prior to instructing container manager 141 to create a container, server 120 can verify that the user is authorized to access the application using the privileged credentials and perform any other functions that a governing policy may require (e.g., logging the attempt, initiating monitoring, etc.).

Figure 2B:
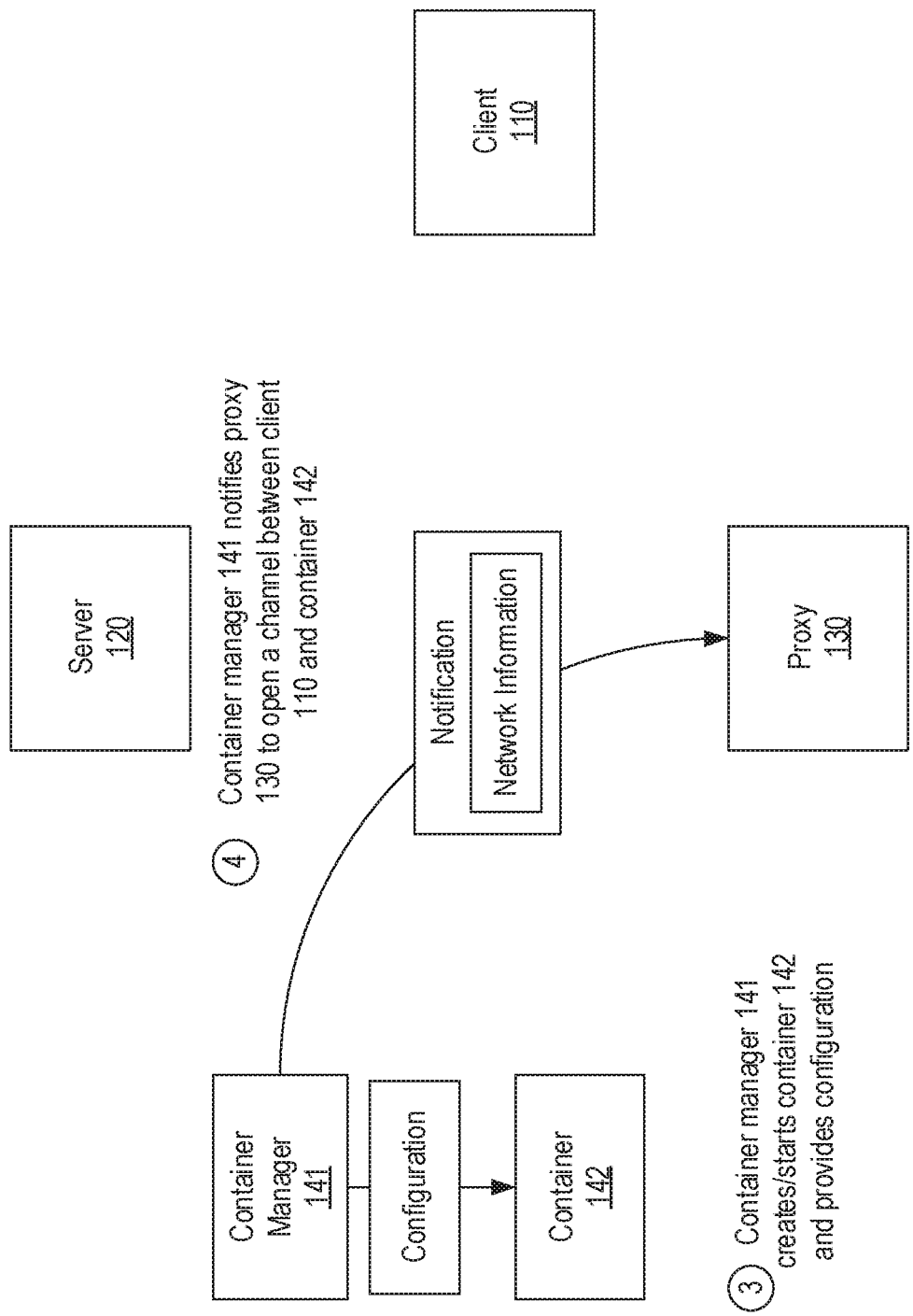

In step 3, shown in FIG. 2B, container manager 141 is shown as creating a container 142 in response to receiving the configuration from server 120 and providing the configuration to the container. Embedded application manager 203 can employ the configuration to launch embedded application 210 including injecting privileged credentials and performing any appropriate modifications to embedded application 210's user interface. Additionally, in step 4, container manager 141 can notify proxy 130 that container 142 has been created and can provide network information to enable proxy 130 to create a channel between container 142 and client 110. For example, this network information can include information about container 142 (e.g., an IP address and port number on which control components 204 will be listening for protocol communications) as well as information about client 110 (e.g., the IP address and port number that client 110 used to communicate with server 120 (which server 120 could have provided to container manager 141 as part of the configuration sent in step 2). In some embodiments, proxy 130 could receive the network information about client 110 directly from server 120. As represented by the dashed line, in other embodiments, container 142 may communicate directly with client 110 rather than through proxy 130 (e.g., when it is not desired to monitor or record the user's session).

Figure 2C:
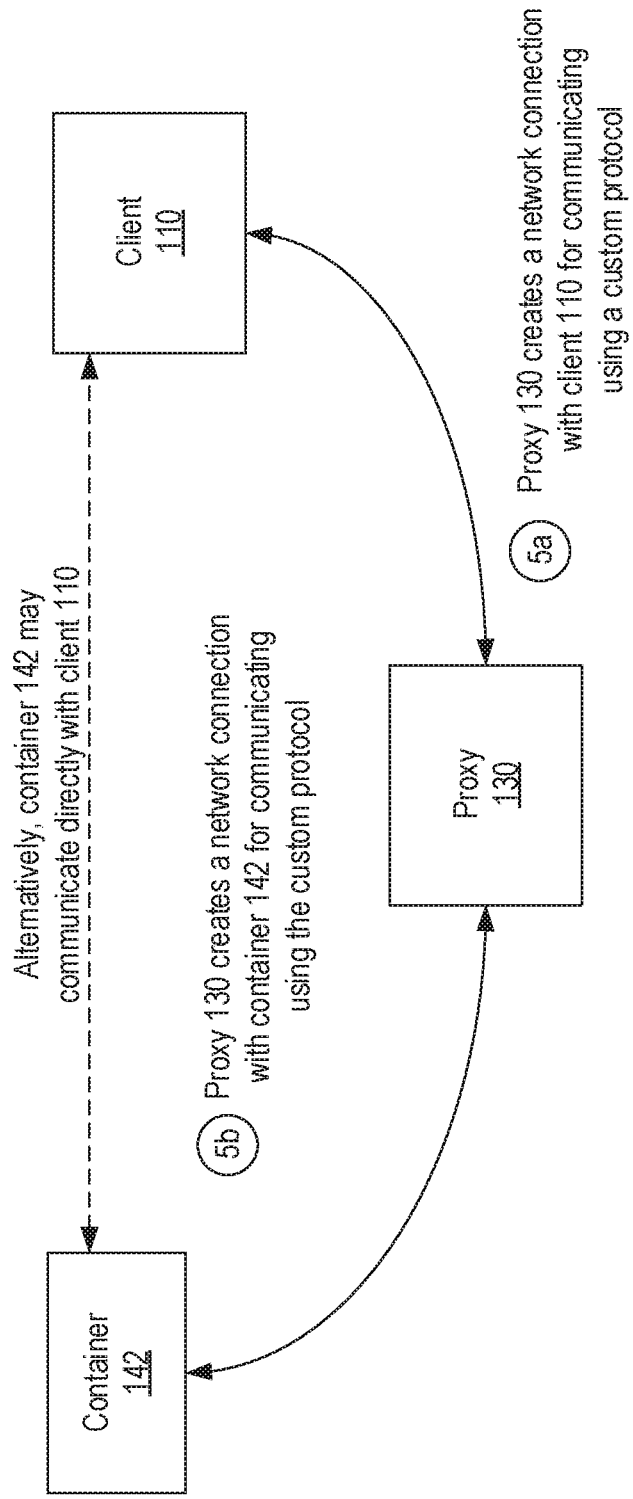

In step 5a shown in FIG. 2C, proxy 130 employs the network information that it received from container manager 141 to create a network connection between client 110 and proxy 130. In some embodiments, this connection between proxy 130 and client 110 can employ the WebSocket protocol. Similarly, in step 5b, proxy 130 can also establish a connection with container 142. In some embodiments, this connection between proxy 130 and container 142 can also employ the Web Socket protocol. Regardless of which transport protocol or protocols are used to establish a channel between client 110 and container 142, the custom protocol referenced above can be used on top of the transport protocol as will be described below.

Figure 2D:
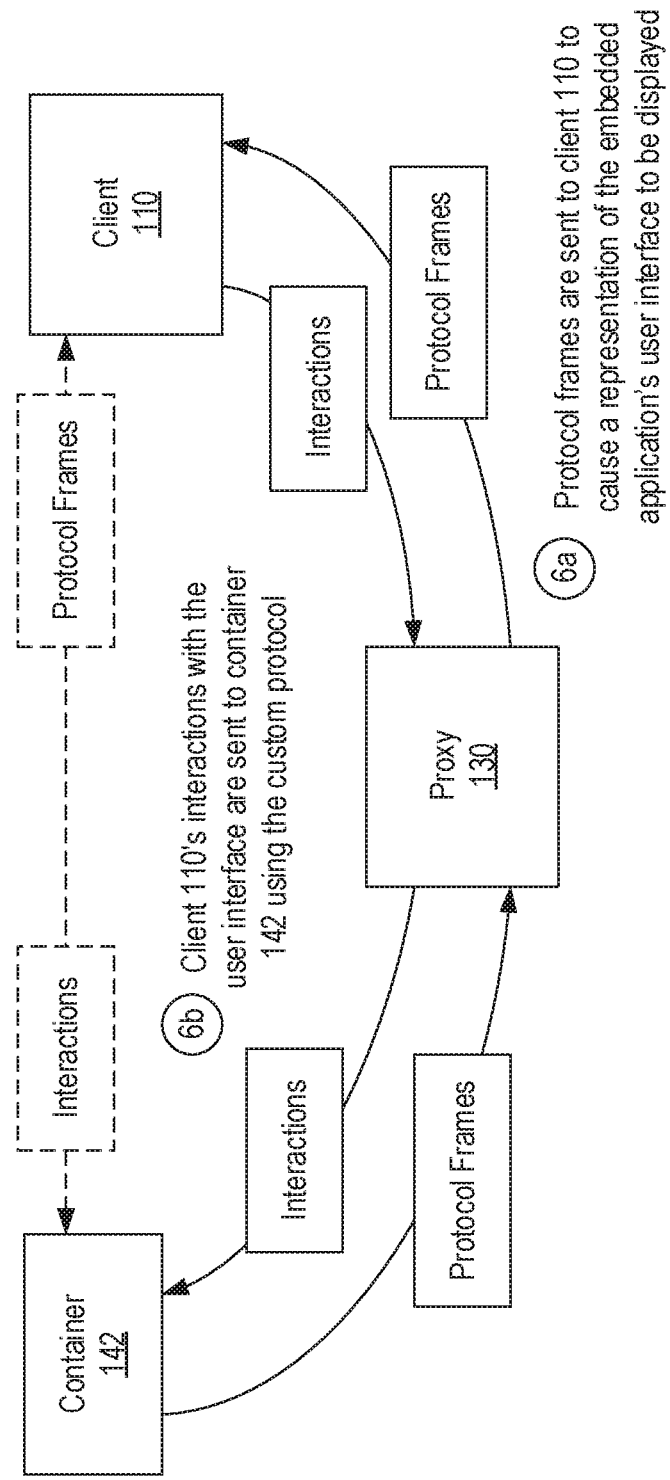
Figure 6C:
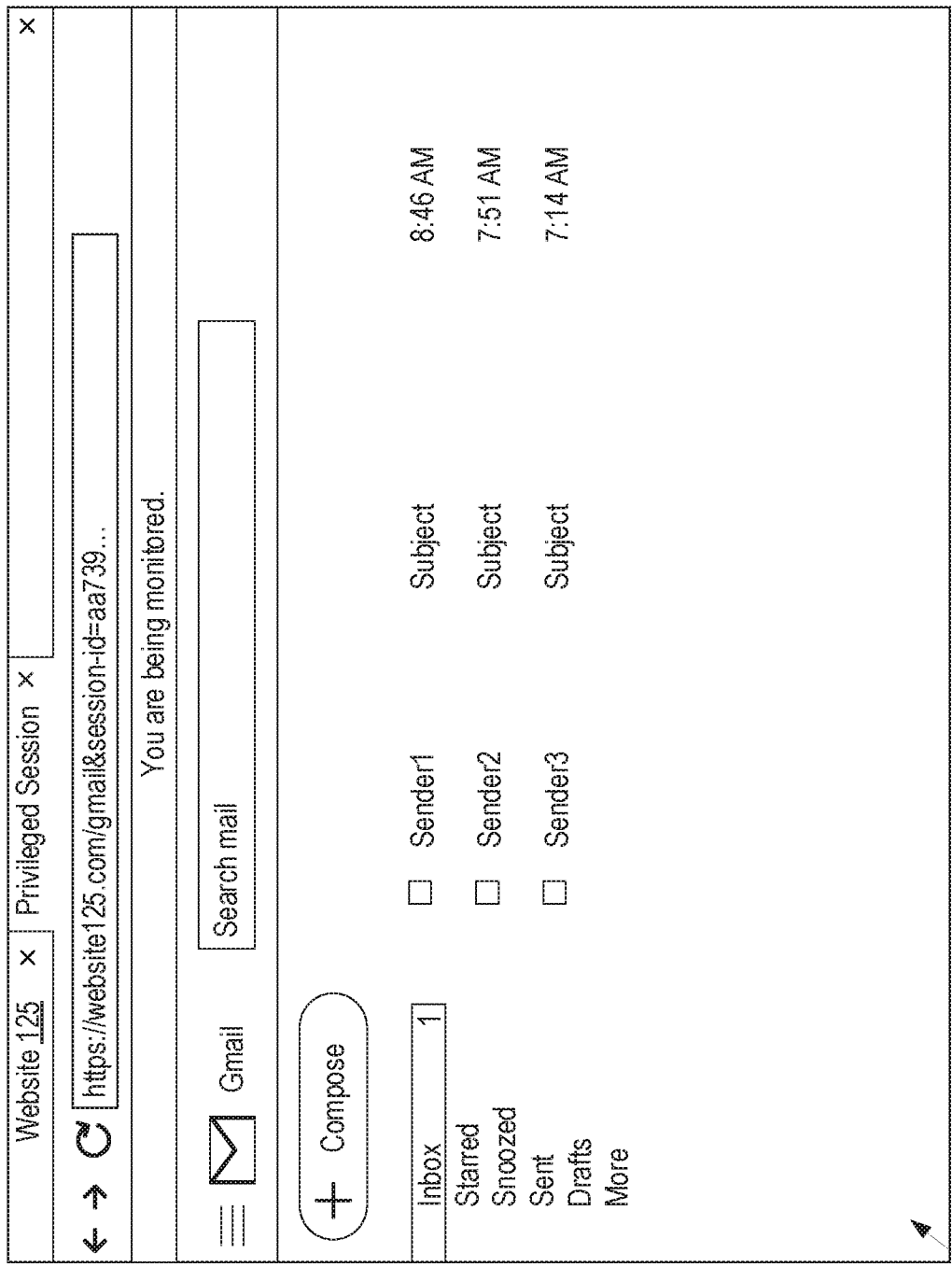

In steps 6a and 6b shown in FIG. 2D, it is assumed that embedded application 210 is running and is therefore generating frames for displaying its user interface. Accordingly, container 142 sends protocol frames to client 110 via proxy 130 (or directly) to cause a representation of embedded application 210's user interface (an "equivalent user interface") to be displayed on client 110. FIG. 6C represents an example of how the user interface of embedded application 210 (which is assumed to be Gmail) may appear on client 110. As shown, website 125 has opened a new tab in which the Gmail user interface is displayed.

The user's interaction with the user interface on client 110 can also be relayed back to control components 204 using the custom protocol. As a general example, website 125 can include JavaScript, WebAssembly and/or other code that detects the user's interaction with the browser in which the Gmail user interface is being displayed and can generate and send protocol communications that define these interactions to container 142. Control components 204 can process these protocol communications to cause embedded application 210 to update its user interface resulting in additional protocol frames being sent to client 110.

Figure 2E:
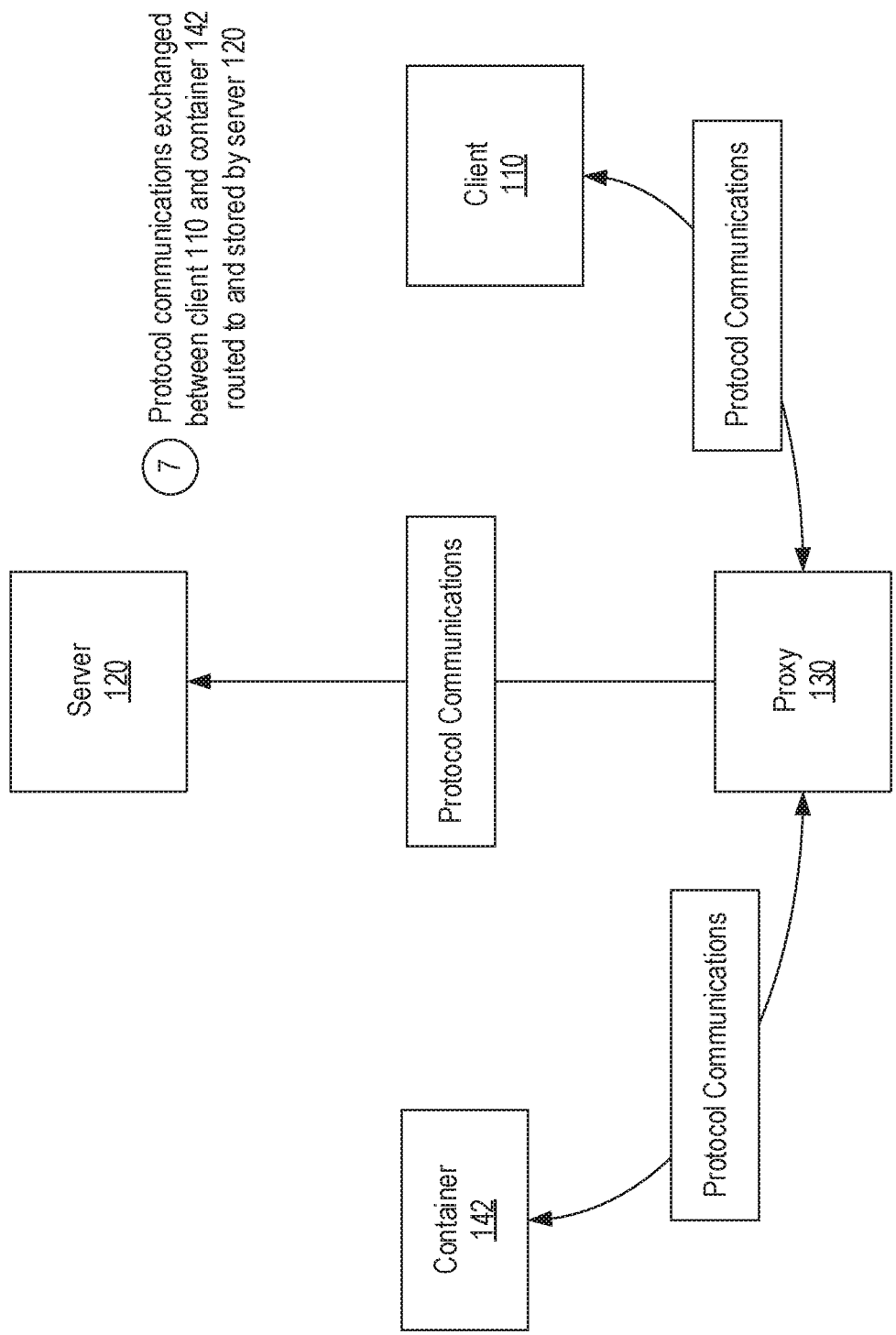

Finally, in step 7 shown in FIG. 2E, the protocol communications that are passed between client 110 and container 142 can be captured and stored. Because these protocol communications flow through proxy 130, proxy 130 can route the protocol communications to server 120 where they can be stored and subsequently employed to playback a user's session. Due to the use of the custom protocol that can be rendered using standard browser techniques, the playback of a user's session is greatly facilitated.

Figure 3A:
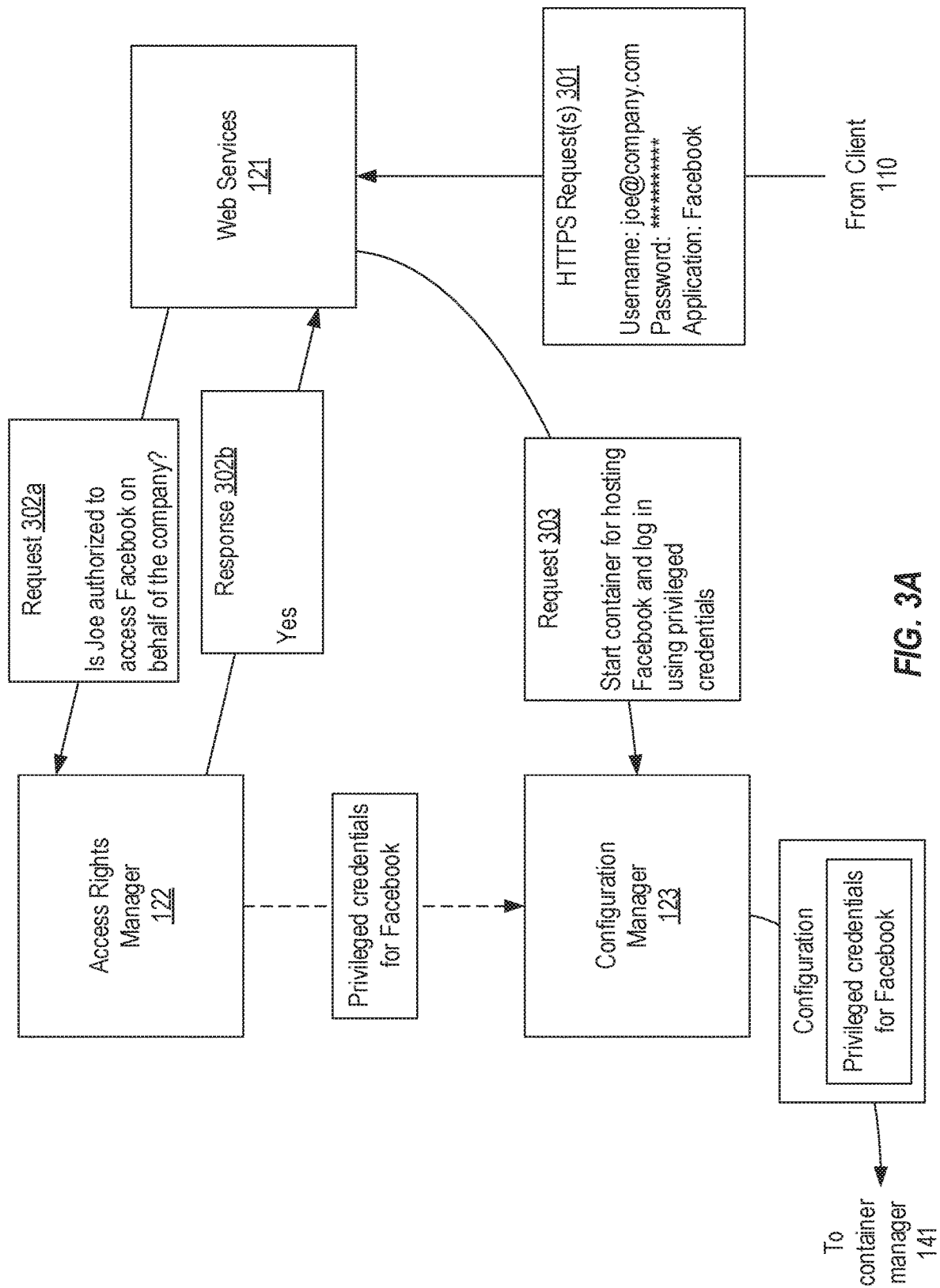
FIGS. 3A and 3B illustrate how a user can be granted access to an application using privileged credentials without divulging the privileged credentials to the user.
Figure 3B:
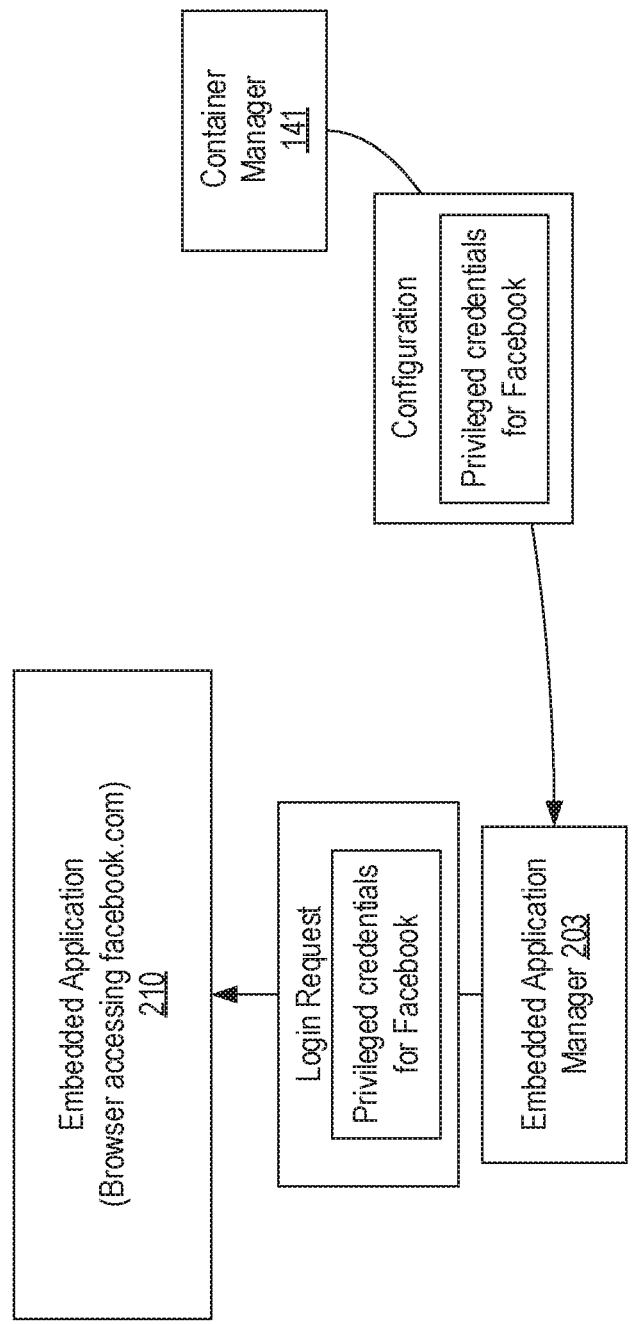

FIGS. 3A and 3B provide more detail regarding how a user can be granted access to embedded application 210 using privileged credentials. FIG. 3A illustrates a sequence of communications that can result when the user submits one or more requests 301 to access an application (e.g., when the user submits his or her personal credentials into the webpage shown in FIG. 6A and selects a particular application in the webpage shown in FIG. 6B). As shown, request(s) 301 can be one or more HTTPS requests that are submitted to web services 121 and that specify the user's credentials (a username of joe@company.com and the corresponding password) along with an identification of the application that the user desires to access. It will be assumed that the user's credentials represent the user's personal account within an organization's system.

In response to receiving request(s) 301, web services 121 can send a request 302a to access rights manager 122 to verify whether the user is authorized to access Facebook on behalf of the organization. For example, web services 121 could pass the user's credentials to access rights manager 122 which could then employ the credentials to determine which, if any, applications the corresponding user has been authorized to access. It is assumed that the user is authorized to access Facebook on behalf of the organization and therefore, access rights manager 122 sends response 302b back to web services 121. Alternatively, after authenticating the user, web services 121 could query access rights manager 122 for all applications that the user is authorized to access and then present each of these applications to the user (e.g., as shown in FIG. 6B).

Next, web services 121 can send request 303 to configuration manager 123 which instructs configuration manager 123 to create and start a container for hosting Facebook and to log in to Facebook using the organization's privileged credentials. Configuration manager 123 can respond to request 303 by obtaining any necessary information for configuring the container to be created and by obtaining the privileged credentials (e.g., from access rights manager 122). Configuration manager 123 can then send the configuration with the privileged credentials to container manager 141.

Turning to FIG. 3B, it is assumed that container manager 141 has employed the configuration to create and start a container. As part of this process, container manager 141 can provide a configuration to embedded application manager 203 which in turn can launch embedded application 210 (e.g., by executing a browser and navigating to facebook.com) and use the privileged credentials to log in to embedded application 210. Although FIGS. 3A and 3B depict that configuration manager 123 provides the privileged credentials to container manager 141 which then provides them to embedded application manager 203, in other embodiments, embedded application manager 203 may be configured to obtain the privileged credentials directly from server 120. Accordingly, the manner in which the privileged credentials are provided to a container is not essential to the invention. Of importance is the fact that the container executes embedded application 210 and logs in using the privileged credentials. Notably, because this login is performed by embedded application manager 203, the privileged credentials will never be revealed to the user.

The following JSON data represents an example of a configuration that causes the container to log in to facebook.com using privileged credentials.

```
[
  {
    "id": "1234-facebook",
    "name": "Facebook",
    "description": "Company Facebook",
    "type": "facebook",
    "commands": [
      {
        "type": "NAVIGATE",
        "parameters": {
          "url": "https://facebook.com"
        },
        "description": "Navigate to Facebook site."
      },
      {
        "type": "SET_VALUE",
        "parameters": {
          "selectors": "input[type=email][name=email][id=email]
              [data-testid=royal_email]",
          "value": "admin@company.com"
        },
        "description": "Set username."
      },
      {
        "type": "SET_VALUE",
        "parameters": {
          "selectors":
            "input[type=password][id=pass][data-testid=royal_pass]",
          "value": "adminpwd"
        },
        "description": "Set password."
      },
      {
        "type": "CLICK",
        "parameters": {
        "selectors":
          "input[type=submit][data-testid=royal_login_button]"
        },
        "description": "Click to login button."
      }
    ]
```

```
    },
]
```

In this example, the configuration identifies a target (facebook.com) and provides a number of commands that embedded application manager 203 should cause to be performed. For example, the NAVIGATE command informs embedded application manager 203 to navigate embedded application 210 to https://facebook.com. The SET_VALUE commands instruct embedded application manager 203 to inject the specified username (admin@company.com) and the specified password (adminpwd) into the specified fields (as defined by the selectors parameter) contained in the HTML content defining facebook.com. The CLICK command instructs embedded application manager 203 to select the specified button. Accordingly, this configuration provides the information to enable embedded application manager 203 to automatically log in to facebook.com using the privileged credentials. In this example, the username and password are contained within the configuration in plain text. In other embodiments, the username and password may be encrypted. In further embodiments, the configuration can identify where embedded application manager 203 can retrieve the privileged credentials (e.g., by identifying a secure vault where the credentials are stored).

The following JSON data represents another example of a configuration that causes embedded application manager 203 to log in to Gmail using privileged credentials. Because the login process for Gmail is different from that of Facebook, a different sequence of commands is defined in this example configuration.

```
[
    {
        "id": "1234-gmail",
        "name": "Gmail",
        "description": " Gmail account",
        "type": "google",
        "commands": [
            {
                "type": "NAVIGATE",
                "parameters": {
                    "url": "https://accounts.google.com"
                },
                "description": "Navigate to Google account."
            },
            {
                "type": "SET_VALUE",
                "parameters": {
                    "selectors": "input[type=email][id=identifierId]",
                    "value": "company_admin@gmail.com"
                },
                "description": "Set username."
            },
            {
                "type": "CLICK",
                "parameters": {
                    "selectors": "div[role=button][id=identifierNext]"
                },
                "description": "Click to identifier next button."
            },
            {
                "type": "SET_VALUE",
                "parameters": {
                    "selectors": "input[type=password][name=password]",
                    "value": "adminpassword"
                },
                "description": "Set password."
            },
            {
                "type": "CLICK",
                "parameters": {
                    "selectors": "div[role=button][id=passwordNext]"
                },
                "description": "Click to password next button."
            },
            {
                "type": "WAIT",
                "parameters": {
                    "milliseconds": 2000
                },
                "description": "Wait."
            },
            {
                "type": "NAVIGATE",
                "parameters": {
                    "url": "https://mail.google.com"
                },
                "description": "Navigate to Gmail."
            }
        ]
    }
]
```

In some cases, a configuration need not provide privileged credentials. For example, it may be desired to monitor a user's access to an application even when the access does not require admin credentials. In this example, the configuration causes embedded application manager 203 to navigate embedded application 210 to google.com but does not log in the user.

```
[
    {
        "id": "1234-google",
        "name": "Google search",
        "description": "Simple navigation example"
        "type": "google",
        "commands": [
            {
                "type": "NAVIGATE",
                "parameters": {
                    "url": "https://google.com"
                },
                "description": "Navigate to Google."
            }
        ]
    }
]
```

In many cases, embedded application 203 can perform the login process without any input from the user of client 110. In such cases, container 142 may not cause the user interface to be displayed on client 110 until after login has completed. In other cases, however, user input may be required. For example, some websites require a challenge-response test (e.g., CAPTCHA, one-time code, etc.) during the login process. In such cases, protocol frames can be sent during the login process so that the user will be able to provide the requested input. In these scenarios, to protect privileged credentials that may have been injected, embedded application manager 203 may modify the user interface of embedded application 210 to remove any portion of the user interface that may contain the privileged credentials. For example, embedded application manager 203 may modify the document object model (DOM) of a webpage to hide the user interface element(s) where the privileged credentials have been entered so that the frame(s) that embedded application 210 generates will not show these elements. As a result, the corresponding protocol frames that will be sent to client 110 will define an image that includes the required challenge-response test but not any elements containing the privileged credentials. This same technique can be employed to hide any other element of embedded application 210's user interface for any other reason.

FIGS. 4A-4D provide more detail of the process by which embedded application 210's user interface is provided to client 110 and by which the user's interactions with the user interface displayed on client 110 are routed back to embedded application 210. As represented as step 1 in FIG. 4A, embedded application 210 in conjunction with compositor 201 causes a frame to be stored in frame buffer 201a. In the context of a website such as facebook.com, this frame would represent the current appearance of the webpage. In step 2, protocol frame builder 202 can access the frame stored in frame buffer 201a and create, from the frame, a protocol frame which can then be stored in protocol frame buffer 202a. In step 3, the protocol frame is sent to client 110 either directly or via proxy 130. When container 142 communicates with client 110 via proxy 130, proxy 130 may also send the protocol frame to server 120 as represented by step 3a.

Figure 4A:
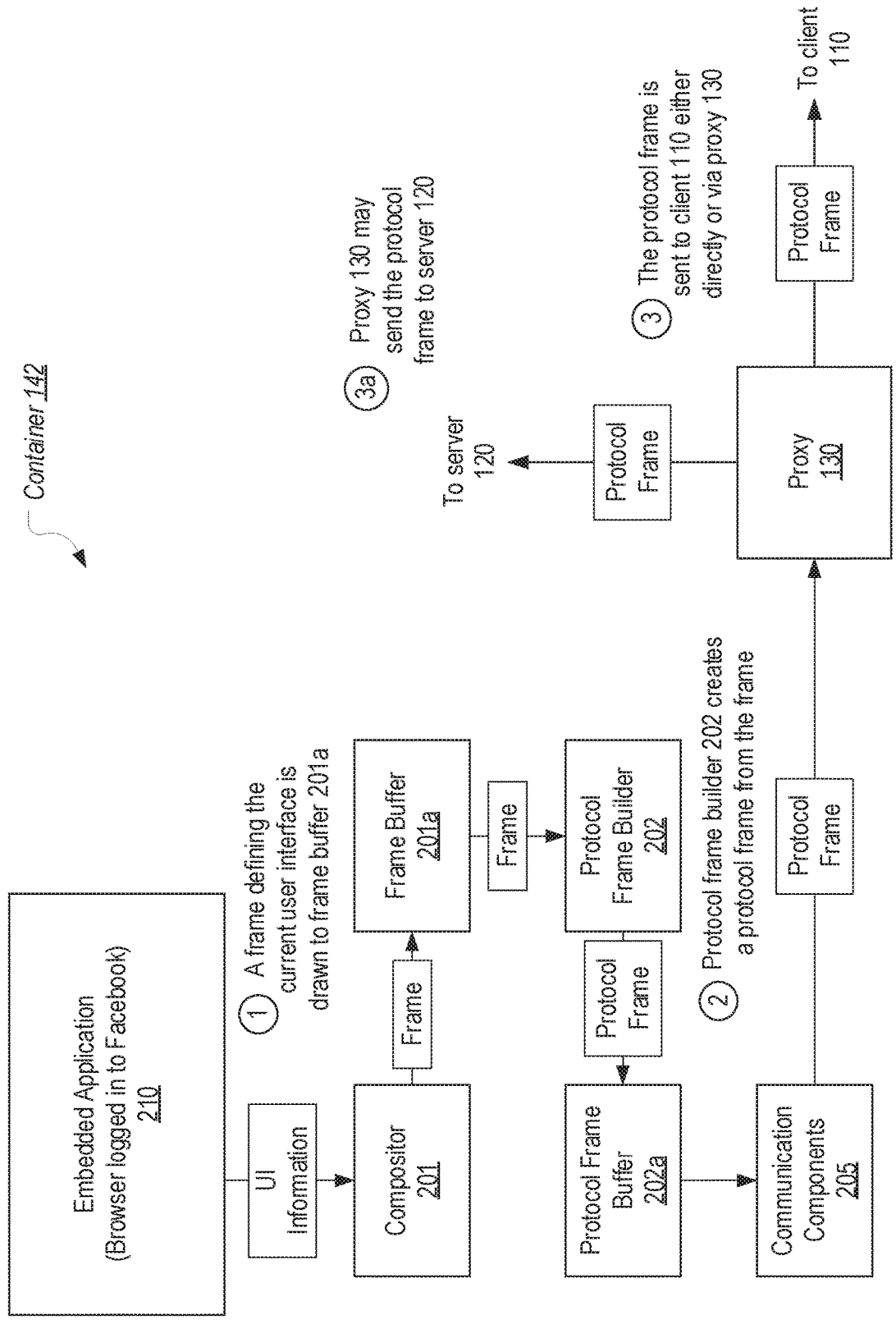
FIGS. 4A-4D illustrate a process by which an equivalent user interface is provided to a client and by which the user's interactions with the equivalent user interface are routed back to an embedded application on a container where the actual user interface exists.
Figure 4B:
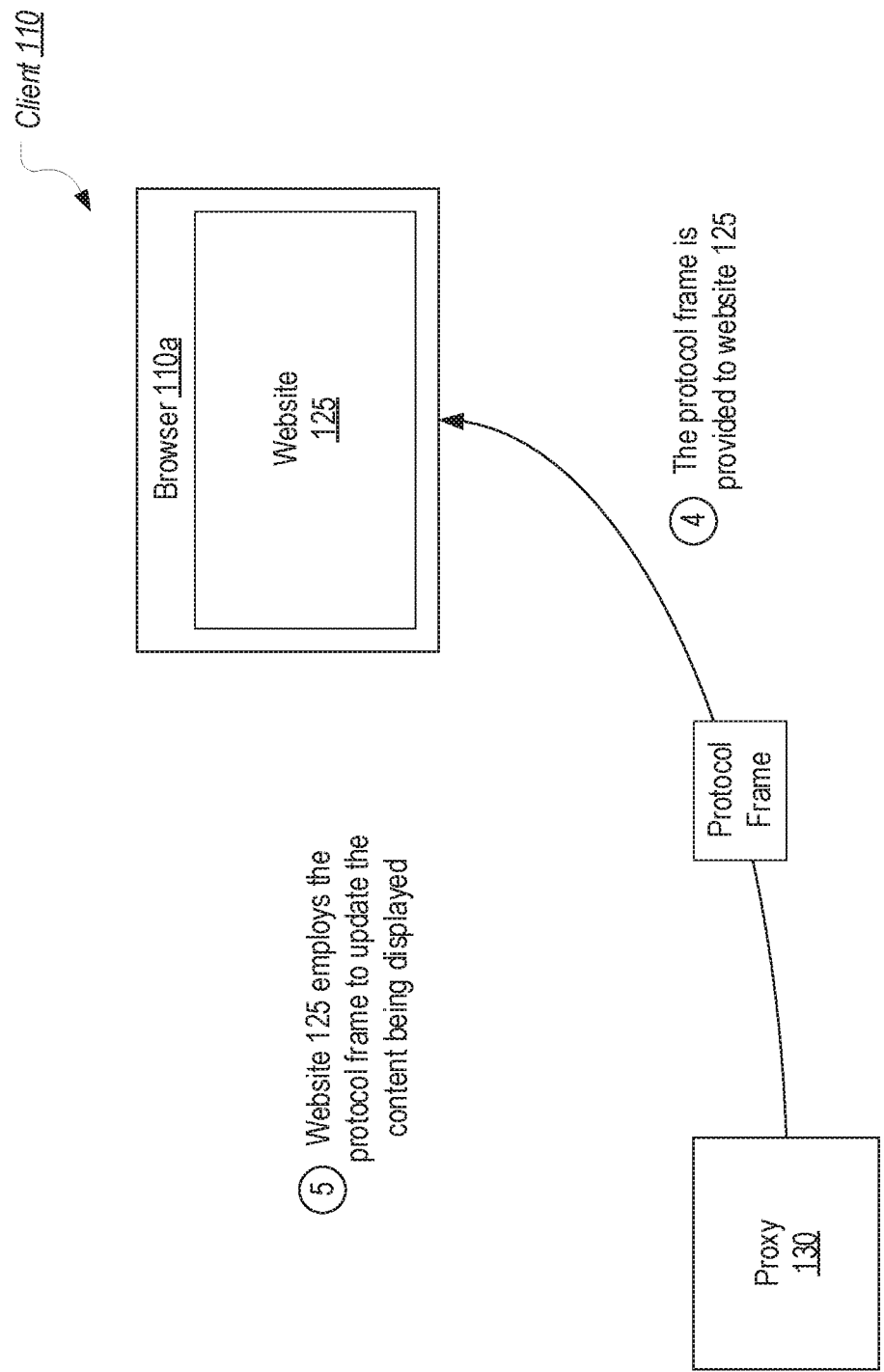

Turning to FIG. 4B, in step 4, the protocol frame is provided to website 125 running in browser 110a (or to a dedicated application). In step 5, website 125 can process the protocol frame to determine how the user interface should be updated. As described in greater detail below, website 125 can include an HTML5 canvas where the user interface is displayed and WebAssembly (or other suitable code) that processes protocol frames to update the HTML5 canvas appropriately. FIG. 6C provides an example where website 125 creates a webpage containing an HTML5 canvas 600 in which a bitmap of the Gmail user interface is displayed. The protocol frames can define how the bitmap of this HTML5 canvas should be updated.

Figure 4C:
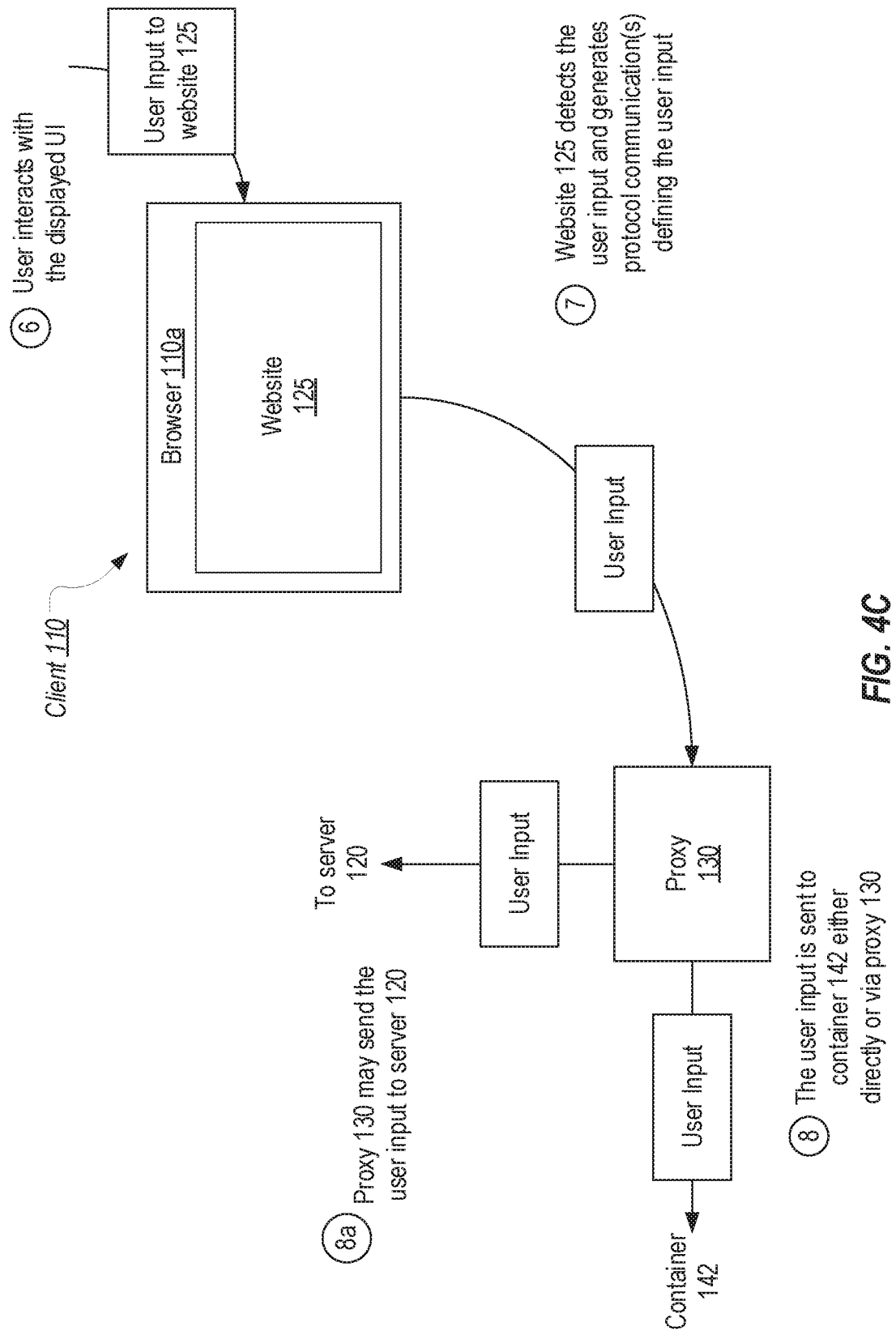

In step 6 shown in FIG. 4C, it is assumed that the user provides input to website 125 where the user interface is displayed (e.g., mouse or keyboard input to the HTML5 canvas). In step 7, website 125 detects this user input and generates one or more protocol communications defining the user input. In step 8, the one or more protocol communications defining the user input are sent to container 142 either directly or via proxy 130. When proxy 130 is employed, proxy 130 may also send the protocol communications to server 120 as represented by step 8a.

Figure 4D:
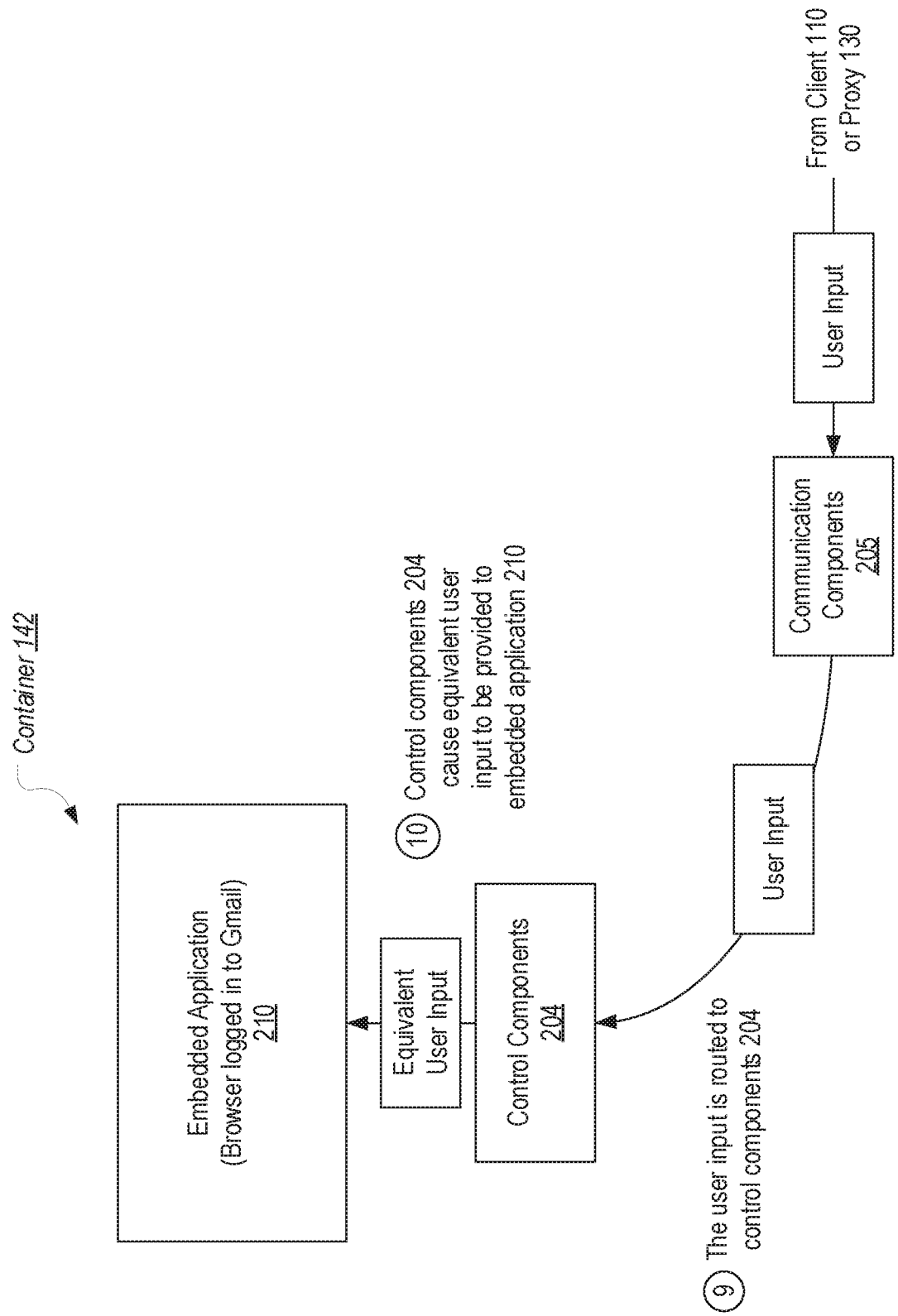

In step 9 shown in FIG. 4D, when container 142 receives protocol communications defining user input, the user input will be provided to control components 204. In step 10, control components 204 can provide equivalent user input to embedded application 210. In this context, equivalent user input means user input that is appropriate for embedded application 210 and that accomplishes what the user intended when the input was provided to the equivalent user interface on client 110. For example, the user input defined in the protocol communications may define a location of mouse input where a representation of a button is displayed in an HTML5 canvas, and the equivalent user input may constitute the clicking of an actual button within the UI of embedded application 210. Similarly, the user input may define keyboard input, and the equivalent user input may constitute keyboard input to a user input element in embedded application 210's user interface that currently has focus.

Figure 5:
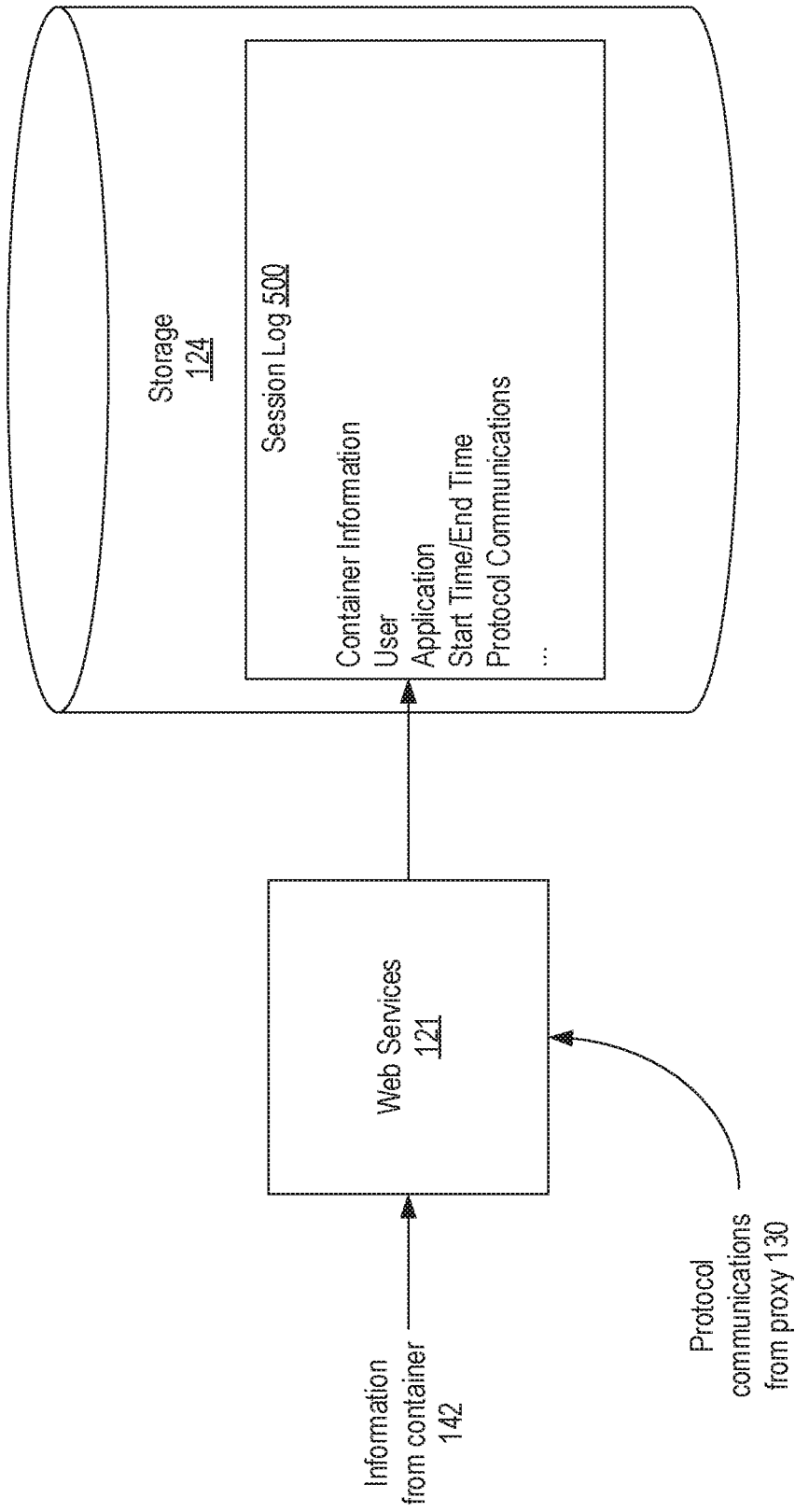
FIG. 5 illustrates how a server can record a user's session when accessing an application with privileged credentials.

FIG. 5 provides additional detail regarding how server 120 can record a user's session when accessing an application with privileged credentials. As shown, web services 121 can be configured to receive protocol communications from proxy 130 and information from container 142 (or from container manager 141). This information can include information about the container (e.g., an identifier of the container), an identifier of the user, an identifier of the application that is being accessed, the start and end time of the session, etc. The protocol communications can include any communication that is sent between client 110 and the container 142 and will therefore define what the user did while accessing the application. Web services 121 can be configured to store (e.g., in storage 124) this information and the protocol communications in a session log 500. With session log 500 created, an administrator or other user can review which sessions exist, replay the sessions and even search for specific events within the sessions as described in detail below.

In addition to replaying a session, server 120 can be configured to monitor and analyze protocol communications as it receives the communications from proxy 130. If a protocol communication or communications reveal that the end user is attempting to perform some action that violates a policy, requires pre-approval, or otherwise should not be allowed, server 120 can communicate with the corresponding container to prevent or delay the communication(s) from being provided to the embedded application. The use of the custom protocol enables server 120 to perform this real-time analysis.

Figure 7A:
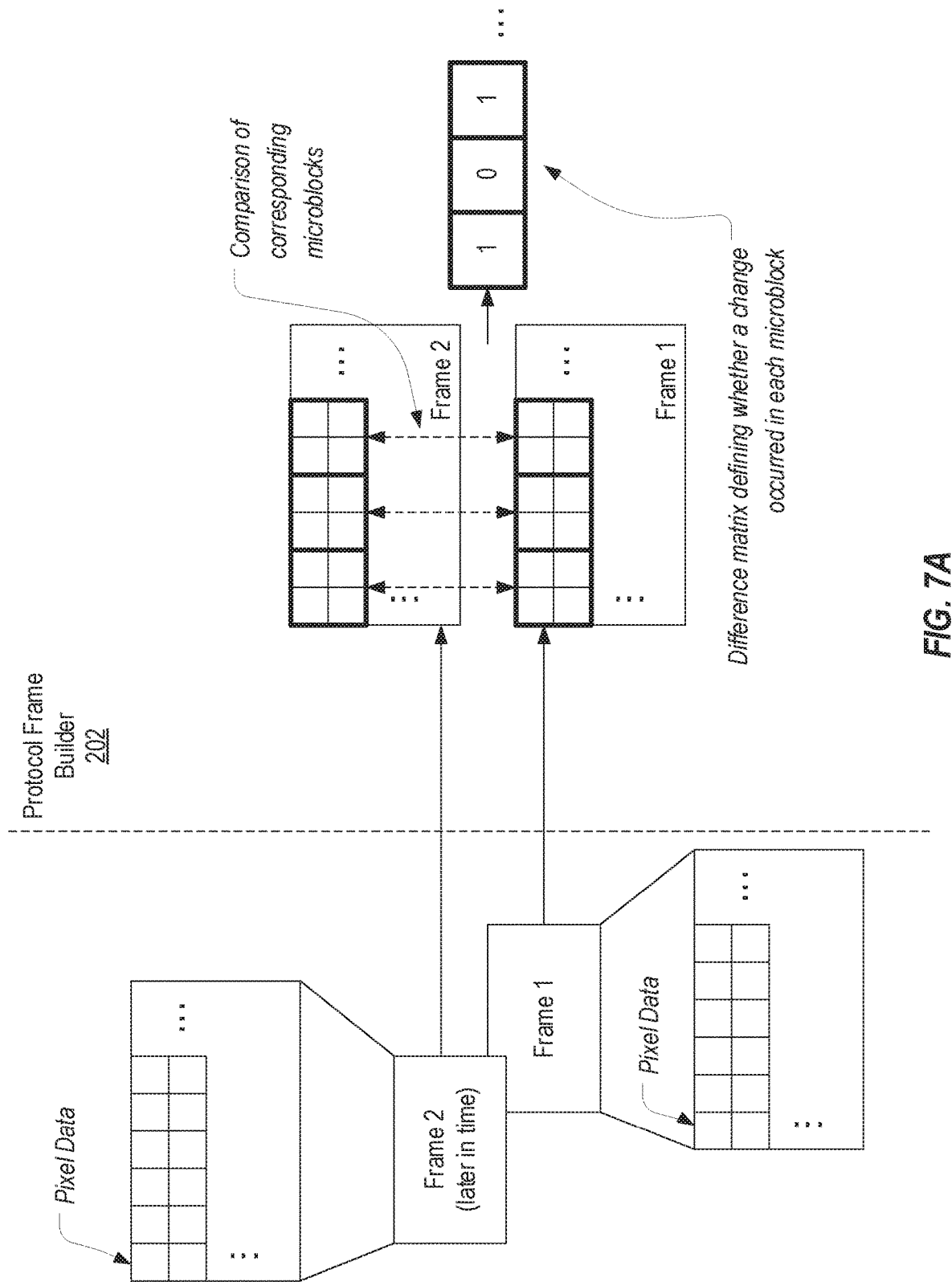
FIGS. 7A-7E illustrate in more detail how a container creates and sends protocol frames to the client and how the client sends user input back to the container.
Figure 7B:
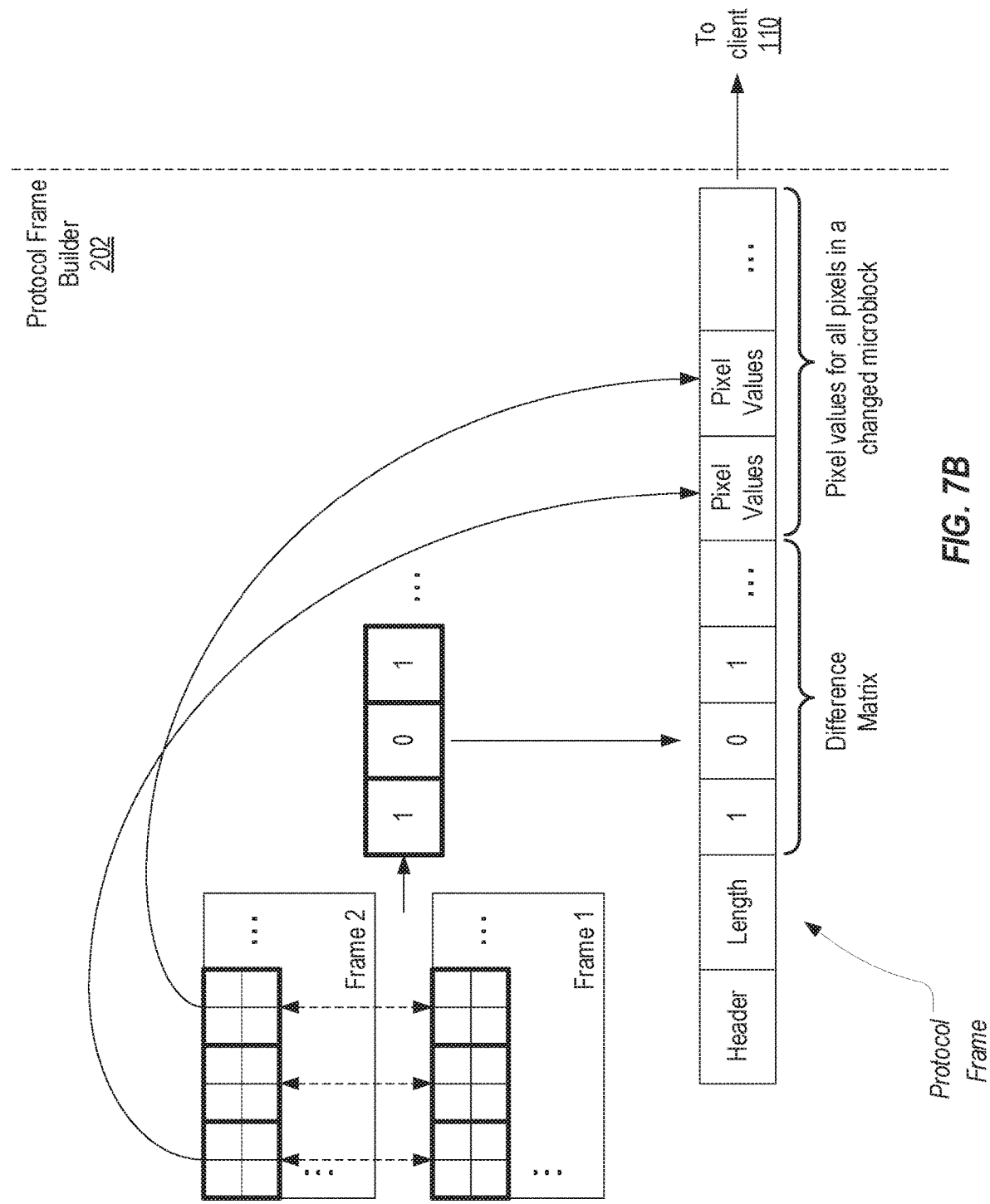
Figure 7C:
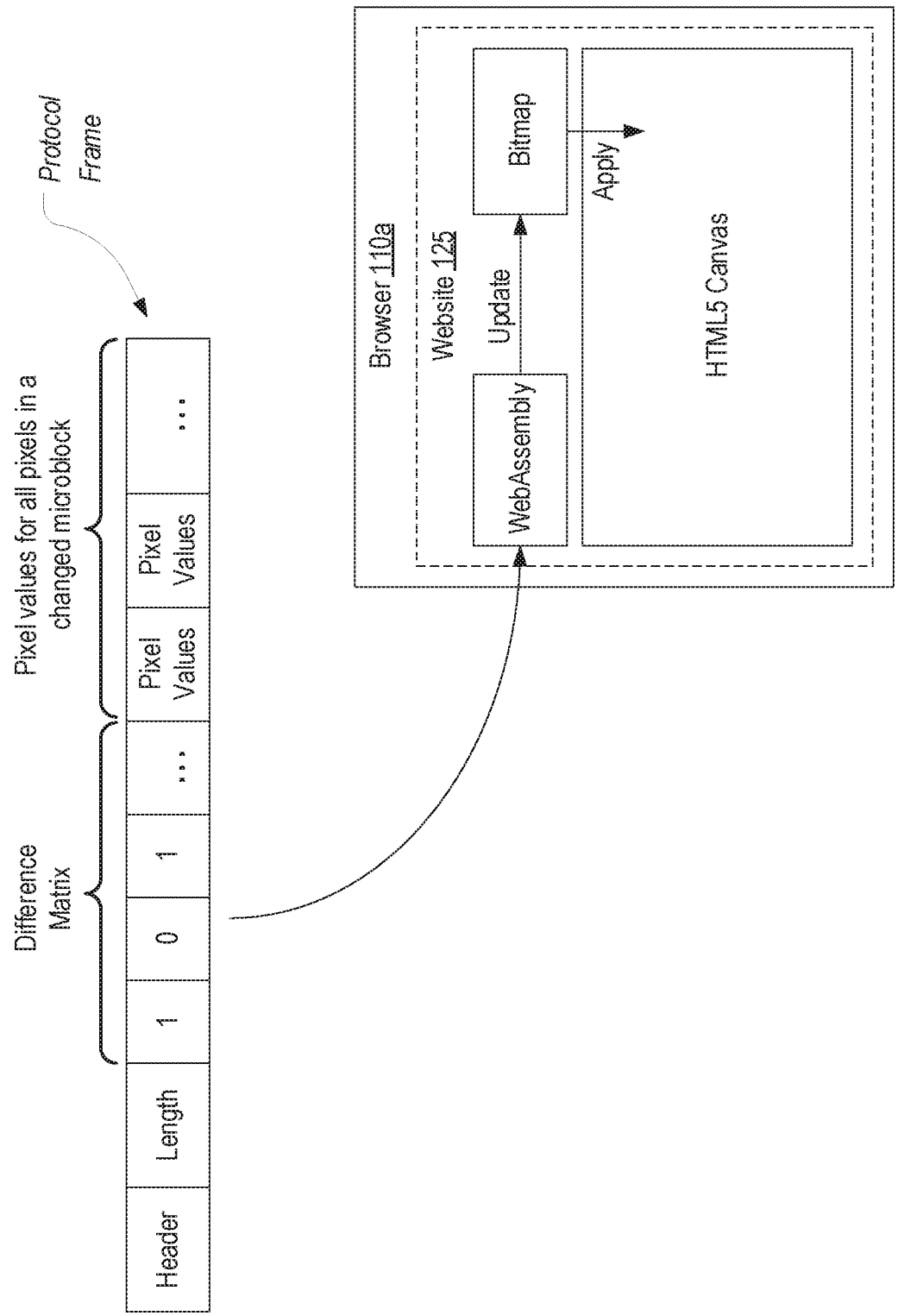

FIGS. 7A and 7B illustrate an example of how protocol frame builder 202 may generate protocol frames while FIG. 7C illustrates how website 125 may employ the protocol frames to display the user interface for embedded application 210 on client 110. The depicted technique for generating protocol frames is one example only, and the present invention could equally be implemented using a difference technique. Protocol frame builder 202 creates protocol frames by comparing a previous frame to a subsequent frame to identify differences. In this regard, it is similar to common video encoding standards. However, unlike these standards, protocol frame builder 202 compares corresponding groupings of pixels (or "microblocks") in the frames and generates a difference matrix defining which microblocks have changed in the subsequent frame. For example, FIG. 7A illustrates a case where protocol frame builder 202 compares microblocks consisting of four pixels that can be viewed as forming a square. The difference matrix that is generated from this comparison can include a bit for each microblock where the bit's value defines whether any pixel in that microblock has changed. Assuming a "1" defines a change, the difference matrix in FIG. 7A indicates that a change occurred in the microblock at the top left corner of frame 2 (or the first microblock), no change occurred in the second microblock and a change occurred in the third microblock.

With the difference matrix calculated, protocol frame builder 202 can generate a protocol frame as is represented in FIG. 7B. As shown, a protocol frame can include a header that may identify the type of protocol frame among possibly many other things, a length field which defines the total length of the protocol frame, the difference matrix and the pixel values for all the pixels in a microblock that the difference matrix identifies as having changed. Accordingly, if a microblock has not changed, a protocol frame will not include the pixel values for the pixels within that microblock. The protocol frame shown in these figures can represent a "protocol difference frame." Although not shown, protocol frame builder 202 can also generate a "protocol key frame" which does not include a difference matrix and includes pixel values for all microblocks. Protocol frame builder 202 can initially send a protocol key frame and then send protocol difference frames. Protocol frame builder 202 can create and send protocol frames at any reasonable interval (e.g., 16-22 protocol frames per second) so that the user interface that is displayed on client 110 will not lag behind the actual user interface that exists on container 142. Again, this technique for generating protocol frames is merely one example of many different suitable techniques.

FIG. 7C illustrates how website 125 can process protocol frames to provide the user interface for embedded application 210 on client 110. As shown, website 125 can include WebAssembly (or other suitable code) that is configured to receive and process protocol frames. This processing can include creating an initial bitmap (e.g., from a protocol key frame) and applying the bitmap to the HTML5 canvas. This processing can also include modifying the bitmap using the content from protocol difference frames and applying the modified bitmap to the HMTL5 canvas. In this way, the user interface of embedded application 210 will be displayed as an image in an HTML5 canvas on client 110. Because the user interface on client 110 is merely an image, the user will not have access to any of the actual user interface elements (e.g., the DOM of a webpage) which may contain sensitive information.

Figure 7D:
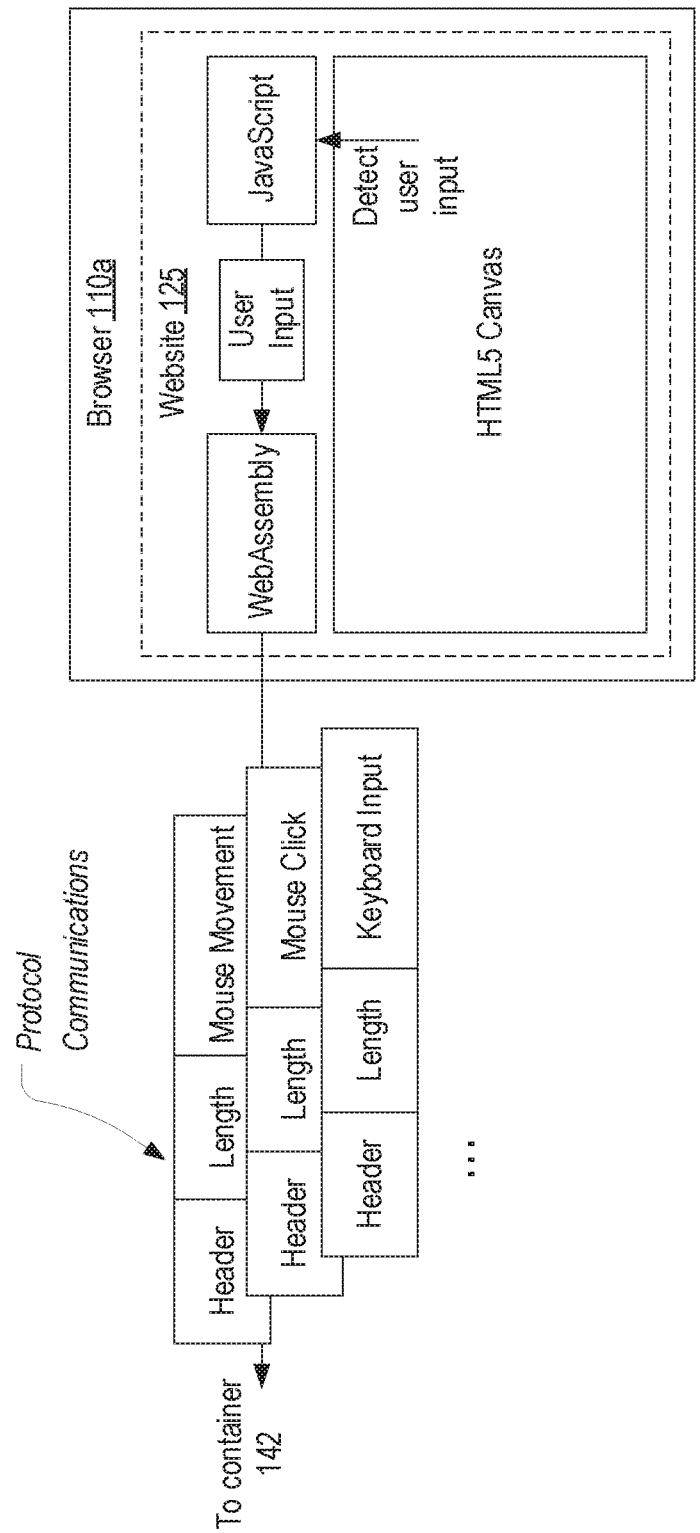
Figure 7E:
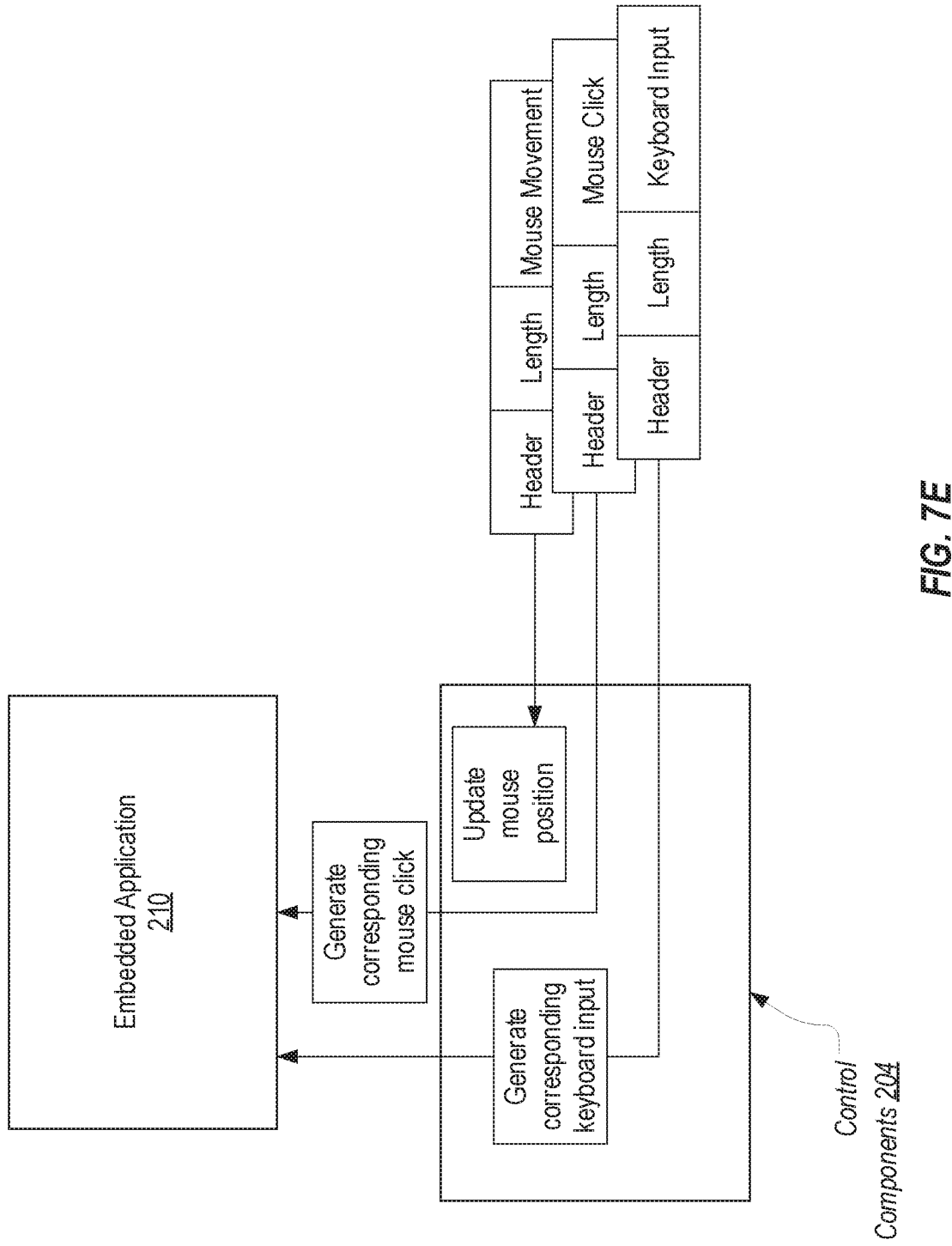

FIG. 7D illustrates how user input to the user interface displayed on client 110 can be reported back to container 142 while FIG. 7E illustrates how this user input can be processed on container 142. In FIG. 7D, website 125 is shown as including JavaScript (or other suitable code) for detecting the user's interaction with the HTML5 canvas in which the user interface is displayed. This can include detecting the position of the mouse overtop the HTML5 canvas, detecting mouse clicks within the HTML5 canvas, detecting keyboard input while the HTML5 canvas has focus, or any other type of user interaction that may be possible with an HTML5 canvas. The JavaScript may interface with the WebAssembly to cause the user input to be sent to container 142 as protocol communications. As shown, these protocol communications can include a header that defines the type of communication, a length field and the payload containing information sufficient to define what user input was detected (e.g., current coordinates of the mouse (which could be sent every $1/30^{th}$ of a second), coordinates of a mouse click, an identification of keyboard input, etc.).

FIG. 7E illustrates that these protocol communications can be relayed to control components 204 which can process them to cause equivalent user input to occur on container 142. For example, if the user input defines mouse movement, control components 204 can update the position of the mouse on container 142 (i.e., synchronize the position of container 142's mouse with the position of client 110's mouse). Similarly, if the user input is mouse or keyboard input, control components 204 can create corresponding mouse or keyboard input and provide it to embedded application 210. The handling of this user input will oftentimes cause embedded application 210 to update its user interface. Accordingly, the processing shown in FIGS. 7A-7E will be continuously performed so that, from the user's perspective, it will appear as if the embedded application is executed on client 110 rather than container 142.

In some embodiments, control components 204 may be configured to selectively block user input. For example, a configuration may define areas of embedded application 210's user interface that should not be accessible to the user. In such cases, control components 204 can evaluate the user input it receives in a protocol communication to determine whether the configuration (or any other policy) indicates that the user input should be allowed. If the user input is not allowed, control component 204 can forego generating corresponding input. Control component 204 could also block certain types of user input by preventing the mouse position from entering a certain area of the user interface. For example, if a protocol communication indicates that the user has positioned the mouse overtop an area of the HTML5 canvas that corresponds with an area of the user interface that should not be accessible, control components 204 could update the mouse position on container 142 so that it remains outside of the area.

Notably, protocol frame builder 202 excludes the mouse from the protocol frames it sends to client 110. In other words, the user interface that is displayed on client 110 (e.g., the image that is displayed in the HTML5 canvas) will not include a mouse cursor. Instead, the local mouse cursor (i.e., the one that the operating system on client 110 generates) will be relied on. For this reason, website 125 can relay the mouse movement to container 142 which will enable control components 204 to synchronize the position of container 142's mouse to the position of client 110's mouse (at least while the mouse is overtop the HTML5 canvas). To facilitate playback of a session, control components 204 can store the position of container 142's mouse in a "trail file."

To facilitate playback of a session, each protocol communication can include a timestamp or other identifier for placing each communication in the proper sequence. As long as the sequence of communications is known, a player consisting of an HTML5 canvas can be employed to view the session. In particular, the player could use the content of the protocol frames to create and update a bitmap that is displayed in the HTML5 canvas. By providing a trail file with the protocol frames, the position of the mouse can be displayed overtop the bitmap thereby enabling the reviewer to see exactly how the user interacted with embedded application 210 (as opposed to seeing a mouse-less view of the user interface being updated).

In addition to capturing the protocol frames to enable playback of the user's session, the present invention may also capture certain events. For example, container 142 may be configured to send notifications to server 120 which identify when embedded application 210 performs certain HTTP requests (e.g., a GET or POST). In some embodiments, a configuration may define the type of events that should be captured and reported to server 120. These events can be stored on/by server 120 to allow a reviewer to search for specific events. The events can be stored with sufficient information (e.g., an identifier of the session in which the event occurred, a timestamp when the event occurred, etc.) to allow the reviewer to jump to the time within the session when the event occurred. For example, server 120 could compile many sessions during which many different users accessed a company's Facebook account using the company's privileged credentials. Using the techniques of the present invention, a reviewer could run a search for any HTTP POST event during those sessions. The reviewer could then replay the portion of any session where the HTTP POST occurred without needing to watch each session individually.

To summarize, a container is used to execute an application including to continuously create and send protocol frames defining the appearance of the application's user interface to a client. The user of the client will therefore only have access to an image of the user interface and will have no access to privileged credentials. The protocol frames can also be stored to enable playback of the user's interactions with the application.

Figure 8:
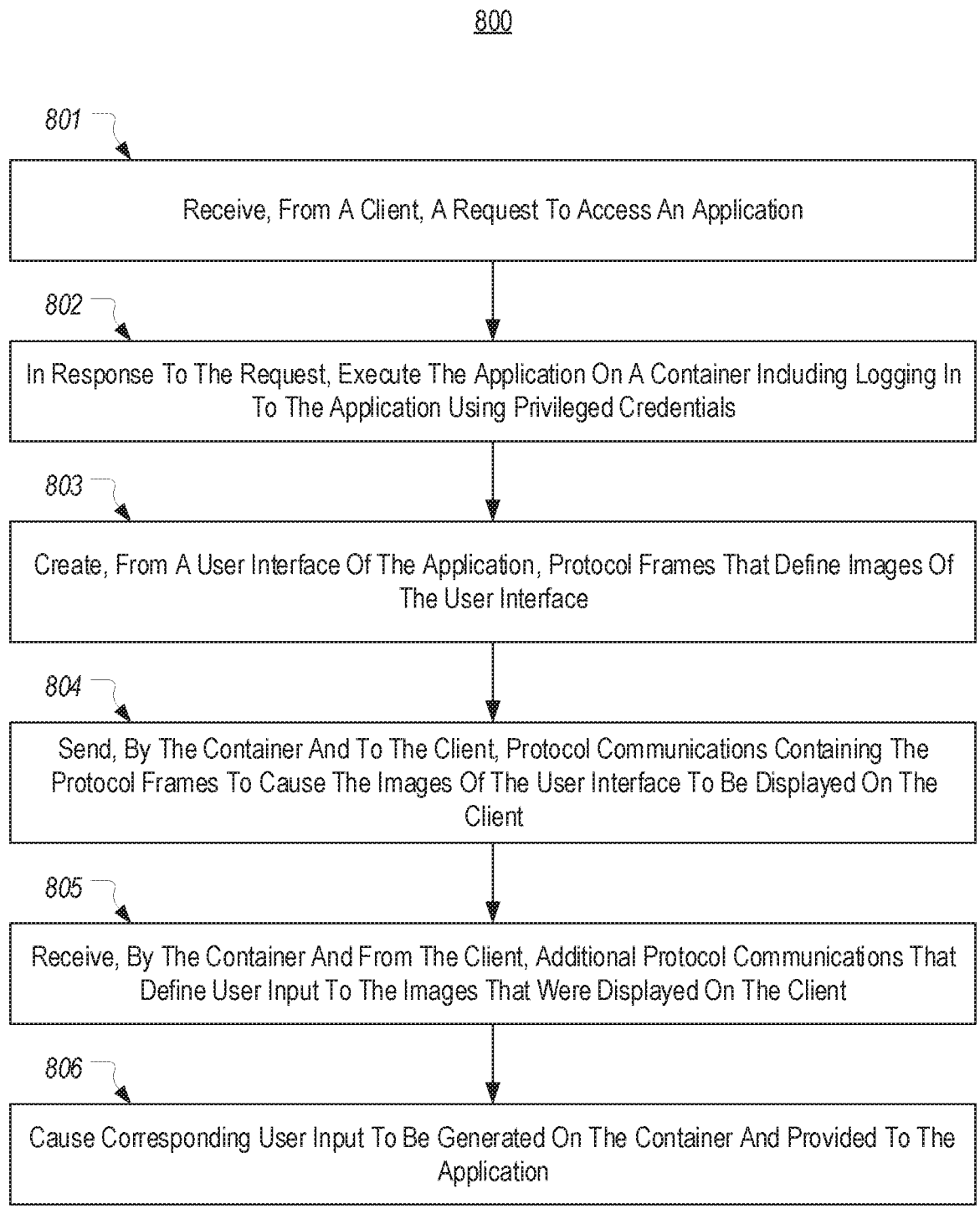
FIG. 8 provides a flowchart of an example method for implementing privileged access management for applications.

FIG. 8 provides a flowchart of an example method 800 for implementing privileged access management. Method 800 can be implemented in environment 100.

Method 800 includes an act 801 of receiving, from a client, a request to access an application. For example, a user of client 110 can access server 120, log in and identify an available application to be accessed.

Method 800 includes an act 802 of, in response to the request, executing the application on a container including logging in to the application using privileged credentials. For example, a container 142 including embedded application 210 can be created, and embedded application manager 203 can log in to embedded application 210 using privileged credentials.

Method 800 includes an act 803 of creating, from a user interface of the application, protocol frames that define images of the user interface. For example, protocol frame builder 202 can generate protocol frames from frames that embedded application 210 causes to be stored in frame buffer 201a.

Method 800 includes an act 804 of sending, by the container and to the client, protocol communications containing the protocol frames to cause the images of the user interface to be displayed on the client. For example, protocol frame builder 202 can cause protocol frames to be sent to client 110 either directly or via proxy 130 to cause the image that is displayed within an HTML5 canvas to be updated.

Method 800 includes an act 805 of receiving, by the container and from the client, additional protocol communications that define user input to the images that were displayed on the client. For example, control components 204 can receive protocol communications that define user input to the HTML5 canvas.

Method 800 includes an act 806 of causing corresponding user input to be generated on the container and provided to the application. For example, control components 204 can update the position of a mouse cursor, generate mouse clicks, generate keyboard input, etc.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for implementing privileged access management comprising:
   receiving, from a client, a request of a user to access an application, the request including or being associated with user credentials of the user;
   evaluating the user credentials that are included in or associated with the request to determine that the user is authorized to access the application using privileged credentials that are different from the user credentials and that the user does not have access to;
   in response to the request, executing the application on a container including logging in to the application using the privileged credentials;
   creating, from a user interface of the application, protocol frames that define images of the user interface by accessing frames that the application generates to represent the user interface and comparing corresponding microblocks in the frames to identify changed microblocks, wherein each microblock encompasses multiple pixels of the frames, and wherein the protocol frames comprise a difference matrix that identifies microblocks that have changed and a payload that includes pixel values for each of the multiple pixels within each changed microblock;
   sending, by the container and to the client, protocol communications containing the protocol frames to cause the images of the user interface to be displayed on the client;
   receiving, by the container and from the client, additional protocol communications that define user input to the images that were displayed on the client; and
   causing corresponding user input to be generated on the container and provided to the application.

2. The method of claim 1, wherein the protocol communications containing the protocol frames are sent to the client via a proxy.

3. The method of claim 2, further comprising:
   forwarding, by the proxy, the protocol communications containing the protocol frames to a server.

4. The method of claim 3, further comprising:
   storing, by the server, the protocol frames in a session log.

5. The method of claim 1, wherein the application comprises a web site and wherein executing the application includes navigating the browser to the website and then logging in to the website using the privileged credentials.

6. The method of claim 1, further comprising:
receiving, at a website executing on the client, the protocol frames; and
for each received protocol frame, employing the protocol frame to update an image of the user interface that is currently stored on the client; and
causing the updated image to be displayed in an HTML5 canvas.

7. The method of claim 6, further comprising:
detecting, by the website, user input to the HTML5 canvas;
wherein the website sends the additional protocol communications in response to the detected user input to the HTML5 canvas.

8. The method of claim 7, wherein the user input defined in the additional protocol communications identifies a mouse position over the HTML5 canvas.

9. One or more computer storage media storing computer executable instructions which when executed implement a method for enabling a user to access an application using privileged credentials without having access to the privileged credentials, the method comprising:
receiving, from a user of a client, a request to access an application using privileged credentials that the user does not have access to;
creating a container that includes the application;
executing the application on the container including logging in to the application using the privileged credentials;
during a login process, modifying the application to prevent one or more user interface elements pertaining to input of the privileged credentials from being included in the user interface;
creating, on the container, a first protocol frame that defines an image of a user interface of the application during the login process such that the image of the user interface that the first protocol frame defines does not include the one or more user interface elements;
sending the protocol frame to the client; and
processing, on the client, the protocol frame to display the image of the user interface of the application.

10. The computer storage media of claim 9, further comprising:
creating, on the container, a second protocol frame that defines the image of the user interface of the application;
sending the second protocol frame to a server; and
storing the second protocol frame in a session log.

11. The computer storage media of claim 10, wherein creating the first protocol frame comprises excluding a mouse cursor while creating the second protocol frame comprises including the mouse cursor.

12. The computer storage media of claim 9, wherein the application comprises a website and wherein executing the application includes navigating a browser to the website and then logging in to the website using the privileged credentials.

13. The computer storage media of claim 9, wherein the image of the user interface that the first protocol frame defines includes a user interface element for receiving input required to log in using the privileged credentials.

14. The computer storage media of claim 9, wherein processing the protocol frame to display the image of the user interface of the application comprises displaying the image in an HTML5 canvas.

15. The computer storage media of claim 9, wherein the first protocol frame defines the image as differences relative to a previous image.

16. A method for enabling a user to access an application using privileged credentials without having access to the privileged credentials, the method comprising:
receiving, from a user of a client, a request to access an application using privileged credentials that the user does not have access to, the request including or being associated with user credentials of the user;
evaluating the user credentials that are included in or associated with the request to determine that the user is authorized to access the application using privileged credentials that are different from the user credentials and that the user does not have access to;
creating a container that includes the application;
executing the application on the container including logging in to the application using the privileged credentials;
while the application is executing on the container, creating and sending protocol frames to the client which define images of the application's user interface;
employing the protocol frames to display the images of the application's user interface on the client;
routing the protocol frames to a server for storage in a session log;
receiving a request to replay the user's access to the application; and
employing the protocol frames stored in the session log to sequentially display the images of the application's user interface to thereby replay the user's access to the application;
wherein the protocol frames sent to the server include a cursor of the container's mouse while the protocol frames sent to the client do not.

17. The method of claim 16, further comprising:
sending, to the server, one or more events that occurred during the user's access to the application; and
storing the one or more events in the session log.

18. The method of claim 16, wherein the protocol frames are sent to the client via a proxy.

19. The method of claim 16, wherein creating the protocol frames comprises accessing frames that the application generates to represent the user interface and comparing corresponding microblocks in the frames to identify changed microblocks.

20. The method of claim 19, wherein each microblock encompasses multiple pixels of the frames, and wherein the protocol frames comprise a difference matrix that identifies microblocks that have changed and a payload that includes pixel values for each of the multiple pixels within each changed microblock.

* * * * *